US007173772B2

(12) United States Patent
Masuda

(10) Patent No.: US 7,173,772 B2
(45) Date of Patent: Feb. 6, 2007

(54) LENS BARREL

(75) Inventor: Shinichi Masuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/996,005

(22) Filed: Nov. 23, 2004

(65) Prior Publication Data

US 2005/0111112 A1     May 26, 2005

(30) Foreign Application Priority Data

Nov. 25, 2003    (JP)   ............................. 2003-393408

(51) Int. Cl.
| | |
|---|---|
| G02B 15/14 | (2006.01) |
| G02B 7/02 | (2006.01) |
| G02B 17/00 | (2006.01) |
| G02B 17/04 | (2006.01) |

(52) U.S. Cl. ...................... 359/696; 359/694; 359/819; 359/822; 359/824; 359/701; 359/703; 396/72; 396/73; 396/85; 310/12

(58) Field of Classification Search ................ 359/819, 359/823, 694–701, 811, 822, 703, 821, 824, 359/700; 396/80–85, 73, 349, 458; 348/240.3, 348/335, 340, 341; 310/12, 13, 15, 311
See application file for complete search history.

(56) References Cited

U.S. PATENT DOCUMENTS

| | | | | |
|---|---|---|---|---|
| 4,948,235 A * | 8/1990 | Akitake | ...................... | 359/700 |
| 5,225,939 A * | 7/1993 | Iizuka | ........................ | 359/811 |
| 5,225,941 A * | 7/1993 | Saito et al. | ................. | 359/824 |
| 5,471,100 A * | 11/1995 | Sakamoto et al. | ............ | 310/12 |
| 5,699,200 A * | 12/1997 | Uno et al. | ................... | 359/700 |
| 5,708,535 A * | 1/1998 | Orimo et al. | ............... | 359/823 |
| 5,937,215 A * | 8/1999 | Mogamiya | .................... | 396/85 |
| 6,292,308 B1 * | 9/2001 | Tsuzuki et al. | ............. | 359/704 |
| 6,392,826 B2 * | 5/2002 | Hayashi et al. | ............. | 359/823 |
| 6,522,840 B2 | 2/2003 | Kano et al. | | |
| 6,570,717 B1 * | 5/2003 | Tu et al. | ...................... | 359/696 |
| 6,618,211 B2 * | 9/2003 | Yumiki et al. | .............. | 359/696 |
| 6,795,251 B2 * | 9/2004 | Nomura et al. | ............. | 359/694 |
| 6,813,441 B2 * | 11/2004 | Yamazaki | ..................... | 396/82 |

(Continued)

FOREIGN PATENT DOCUMENTS

JP        57-115509 A      7/1982

(Continued)

*Primary Examiner*—Loha Ben
(74) *Attorney, Agent, or Firm*—Canon USA, Inc. Intellectual Property Division

(57) ABSTRACT

A guide bar used in a video lens barrel in the related art has problems of deterioration in supporting accuracy of the lens retaining frame, high manufacturing cost, and upsizing of the lens barrel. Also, in a cam pin type lens barrel, how the lens retaining frame is supported by the cam pins may not be clear. Therefore, by providing a plurality of guiding members on the inner surface of the fixed barrel of the lens barrel, and allowing a plurality of engaging portions on the lens retaining frames to engage the guiding members, the lens retaining frames are supported so as to be capable of moving in the direction of the optical axis. By differentiating the length of engagement of the respective engaging portions, the roles of the respective engaging portions on the lens retaining frames for supporting the lens unit in a space are clarified.

18 Claims, 25 Drawing Sheets

U.S. PATENT DOCUMENTS 6,836,057 B2 * 12/2004 Hata .......................... 310/328
7,016,121 B2 * 3/2006 Kawanabe et al. ......... 359/694

FOREIGN PATENT DOCUMENTS

| JP | 60-149536 U | 10/1985 |
| JP | 5-072462 A | 3/1993 |
| JP | 5-96813 U | 12/1993 |
| JP | 06-174998 | 6/1994 |
| JP | 07-120656 | 5/1995 |
| JP | 8-262302 A | 10/1996 |
| JP | 10-039191 A | 2/1998 |
| JP | 11-084210 A | 3/1999 |
| JP | 2001-183722 A | 7/2001 |
| JP | 2003-131109 A | 5/2003 |

* cited by examiner

LENS BARREL

BACKGROUND OF THE INVENTION

1. Field of the Invention

The present invention relates to a lens supporting mechanism in a lens barrel in a video camera or the like.

2. Description of the Related Art

There is a method of supporting a lens barrel in which a lens retaining frame is supported in a space with a thin shaft called "rod" or "guide bar" (for example, see Patent Document 1). There is also another method of supporting a lens barrel in the related art in which the lens retaining frame is supported in a space using three pins (cam followers) and cam grooves (for example, see Patent Document 2).

As described in a first embodiment of the lens barrel (pp. 3, FIGS. 1, 2 and 3), there is a video lens barrel in which a lens retaining frame (movable lens frames 5 and 6) is supported with two guide bars 3 and 4) fixed at both ends to a fixed barrel 1 and a fixed barrel 2 so as to be capable of moving in the direction of optical axis. Zooming is performed by driving the first movable lens frame 5 by a first stepping motor 11, and driving the second movable lens frame 6 by a second stepping motor 12.

As described in the first embodiment of an optical apparatus, a general lens barrel using a cam includes three follower pins 1-*a* provided outside a moving first frame group 1 are fitted respectively into an elongated hole 4-*a* on a straight barrel 4 and a cam groove 5-*a* of a cam cylinder 5 (see FIG. 5 in Japanese Patent Application Laid-Open No. H07-120656). Likewise, three follower pins 2-*a* provided outside a second frame group 2 are fitted respectively into the elongated hole 4-*a* on the straight barrel 4 and a cam groove 5-*b* of the cam barrel 4 (see FIG. 5 in Japanese Patent Application Laid-Open No. H06-174998). When a zooming and focusing motor 8 is driven, the cam barrel 4 rotates, and hence the first frame group 1 and the second frame group 2 are driven in the direction of the optical axis (pp. 3, FIG. 1, FIG. 4, and FIG. 5).

The lens barrel of a guide-bar type in the related art described above has following characteristics. (1) Since the guide bar is fixed at both ends to the fixed barrel or the like, it has a fixed beam structure, the midsection of the guide bar may be bent, and hence accuracy of eccentricity of the lens retaining frame is deteriorated, whereby quality of picture image may be deteriorated. (2) The guide bar, which is a single component, is required to have high degree of accuracy in its diameter or straightness, whereby the manufacturing cost is high, and thus the cost of the lens barrel may be increased. (3) The lens retaining frame is required to have a sufficient thickness for surrounding the guide bars to be fitted, whereby the lens barrel may be upsized.

The lens barrel of a cam pin type in the related art as described above is characterized by its multifunction and compact design since the lens retaining frame is retained in the lens barrel and is driven only by three cam pins disposed outside the lens retaining frame. However, such multifunction may cause deterioration of the level of accuracy in eccentricity, which is difficult to improve.

SUMMARY OF THE INVENTION

It is an object of the invention to provide a lens barrel which is lower in cost than the lens barrel in the related art with higher degree of accuracy and is capable of being downsized.

Further objects, features and advantages of the present invention will become apparent from the following description of the preferred embodiments (with reference to the attached drawings).

BRIEF DESCRIPTION OF THE DRAWINGS

FIG. 13 is a front view of the first embodiment illustrating a state in which the second and fourth group lens retaining frame and the fixed barrel are built-in.

FIG. 18 is a front view of the second embodiment illustrating a state in which the second and fourth lens group retaining frames and the fixed barrel are built-in.

FIG. 22 is a front view of the third embodiment in which the second and fourth lens group retaining frames are built-in.

DETAILED DESCRIPTION OF THE PREFERRED EMBODIMENTS

Referring to the attached drawings, preferred embodiments of the invention will be described below.

First Embodiment

Figure 2:
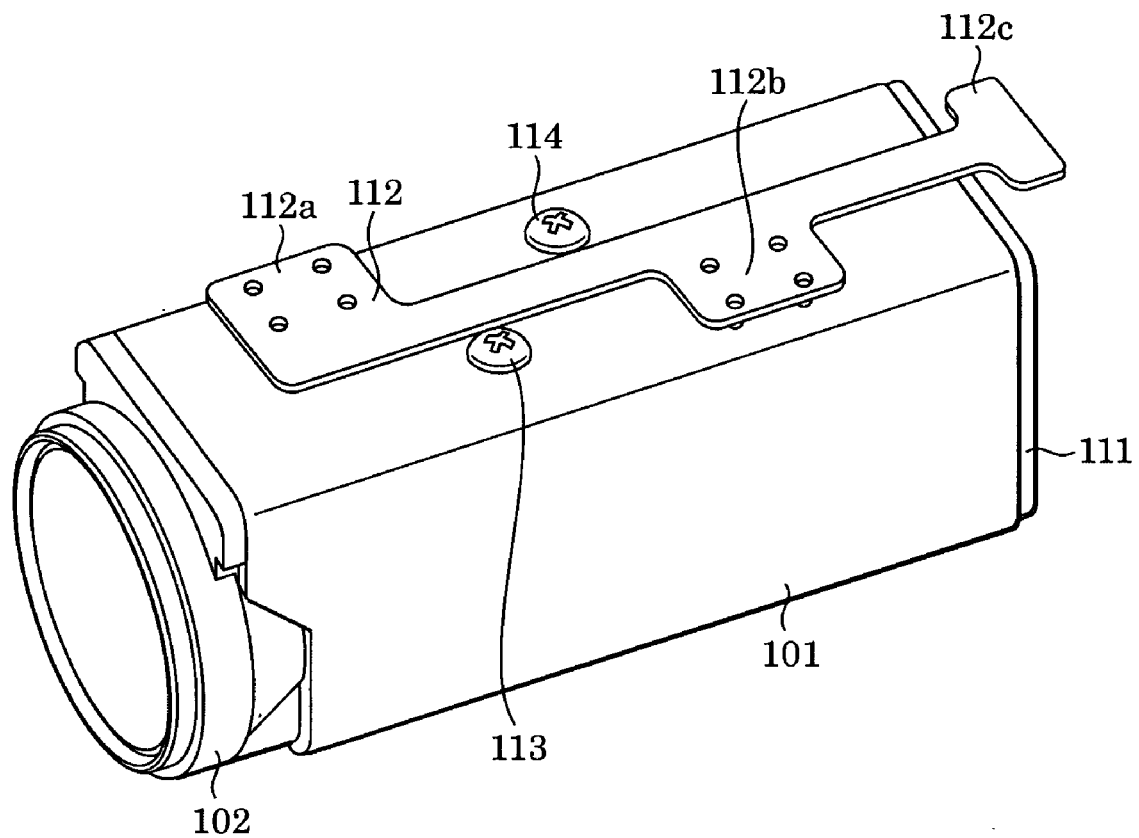
FIG. 2 is an appearance view of a lens barrel in the first embodiment.
Figure 3:
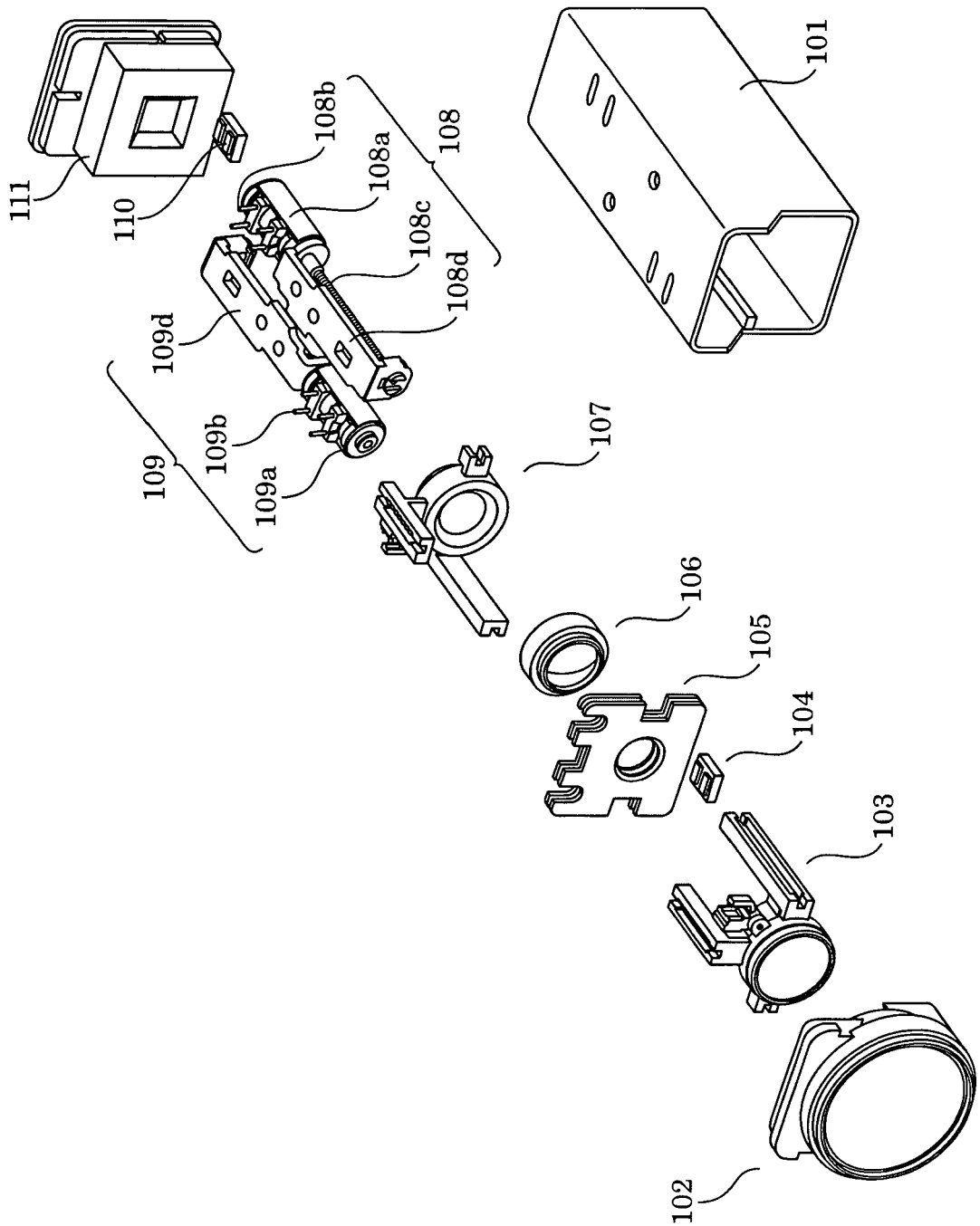
FIG. 3 is an exploded perspective view of the first embodiment.
Figure 4:
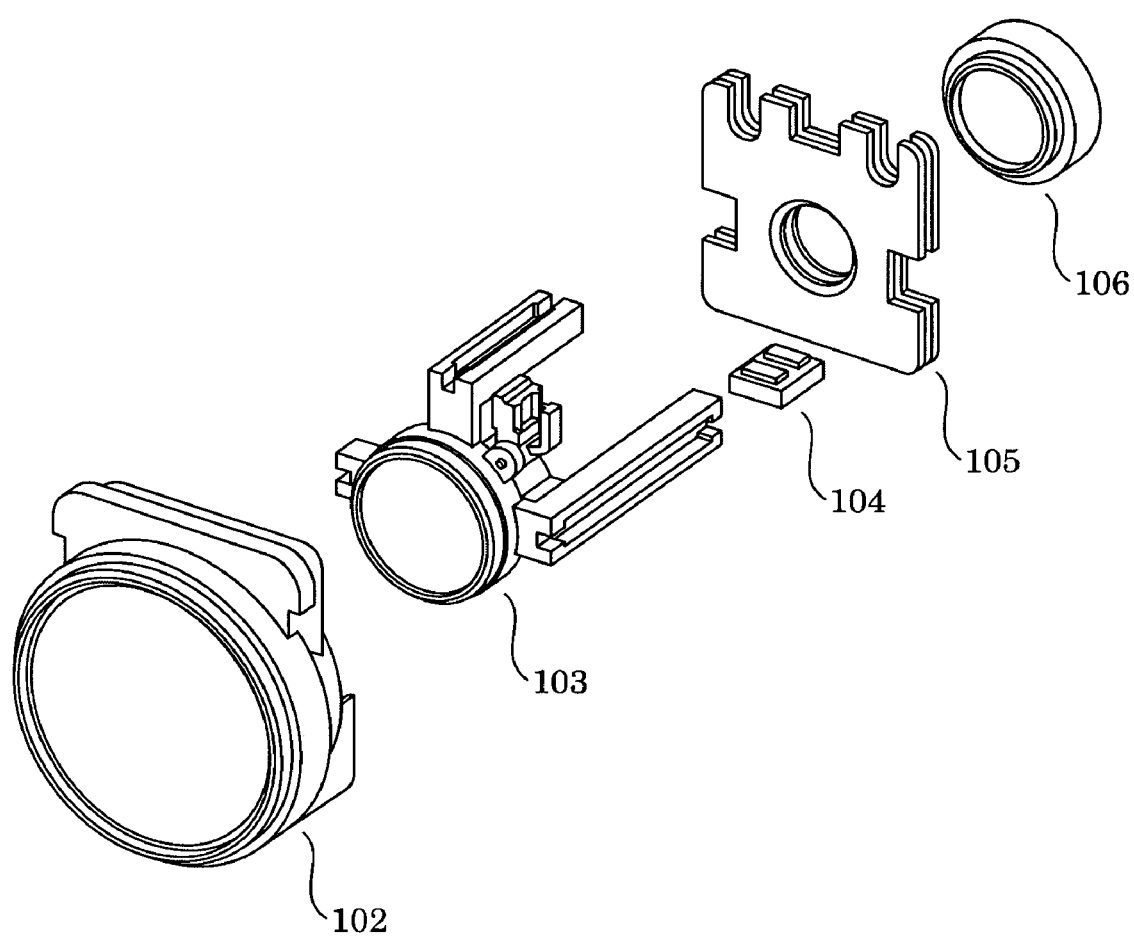
FIG. 4 is an enlarged view of the front side of the exploded perspective view in FIG. 3.
Figure 5:
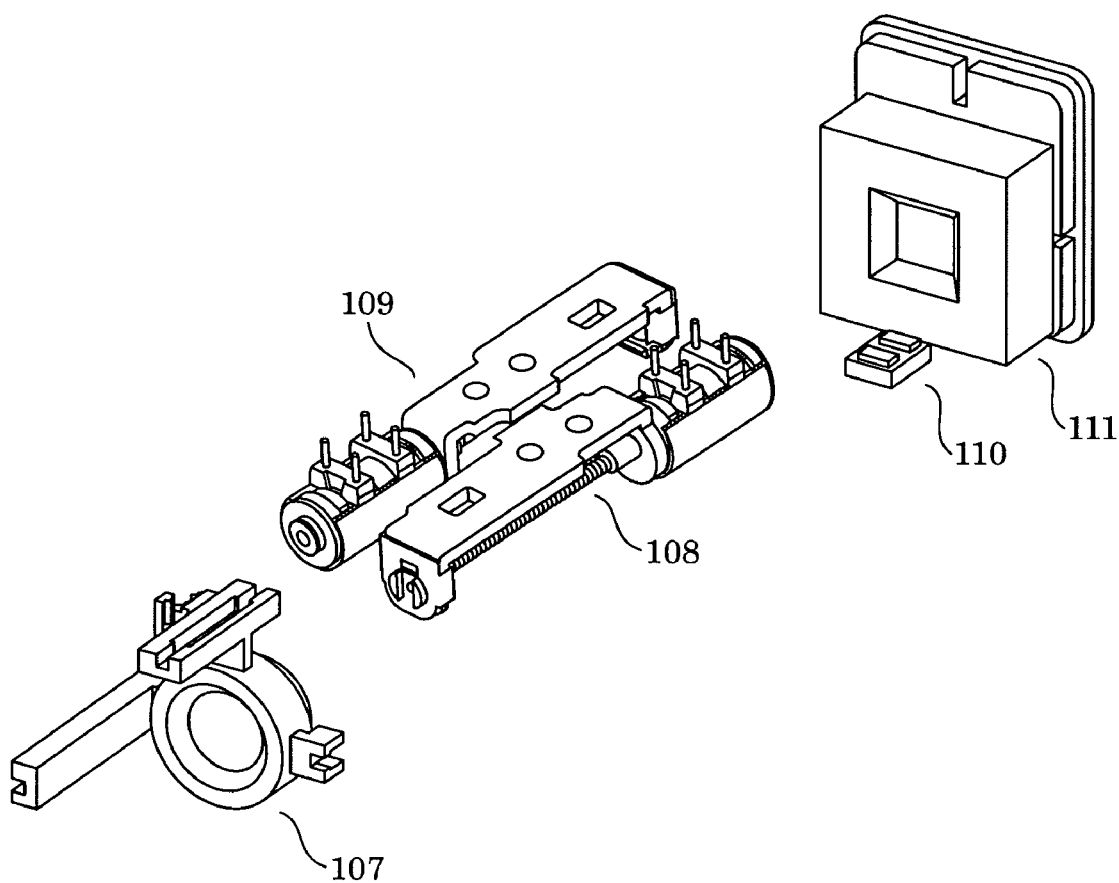
FIG. 5 is an enlarged view of the back side of the exploded perspective view in FIG. 3.
Figure 6:
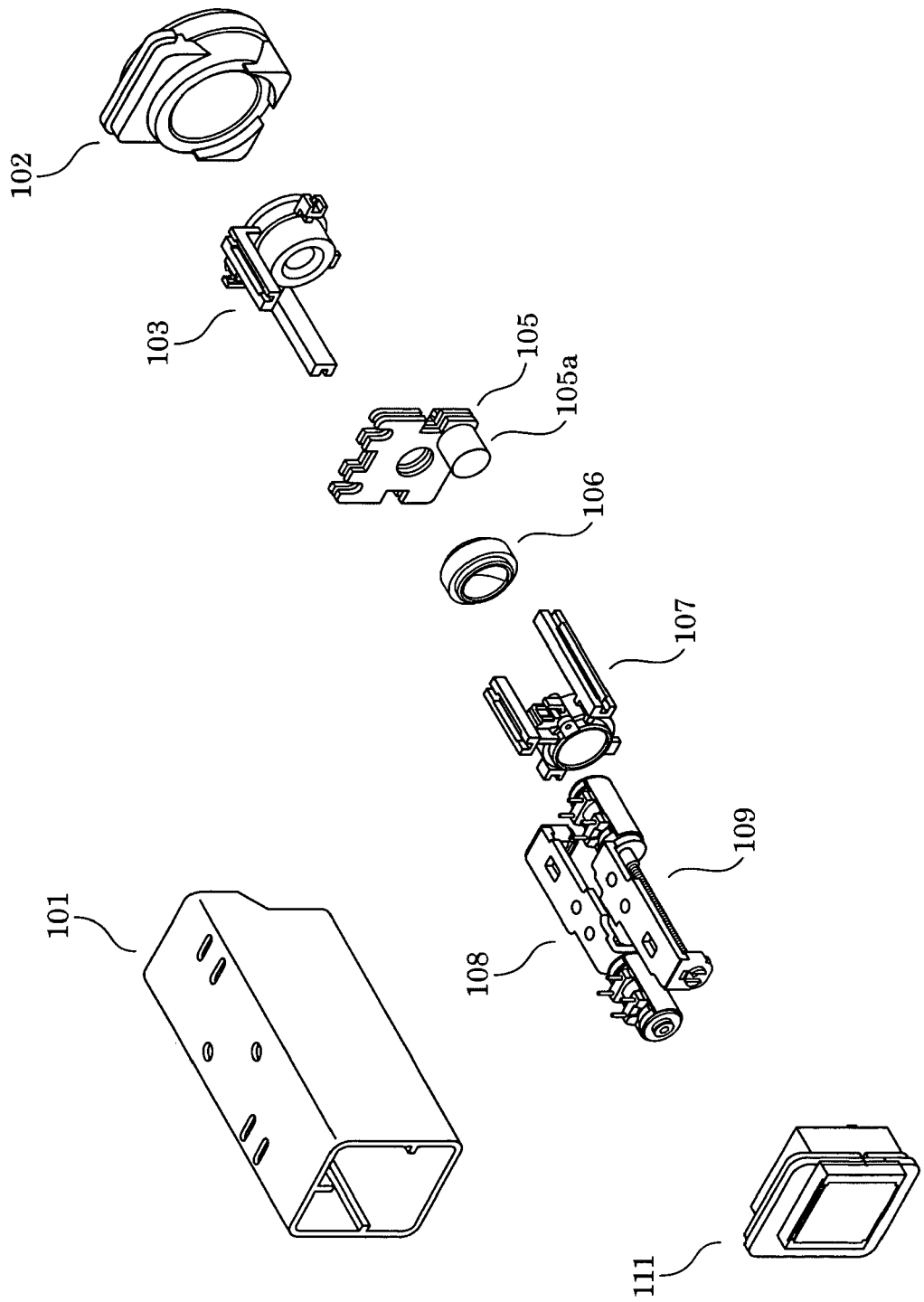
FIG. 6 is an exploded perspective view of the lens barrel viewed from the back side in the first embodiment.
Figure 7:
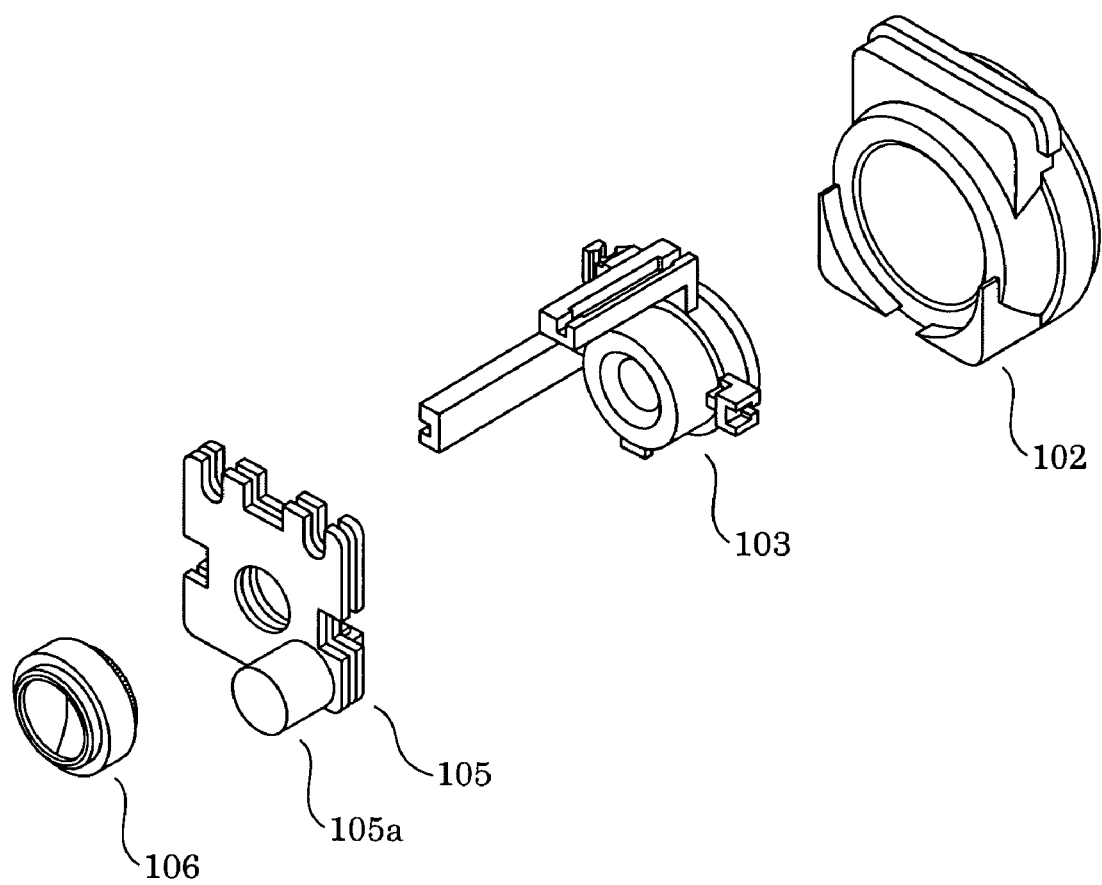
FIG. 7 is an enlarged view of the front side of the exploded perspective view in FIG. 6.
Figure 8:
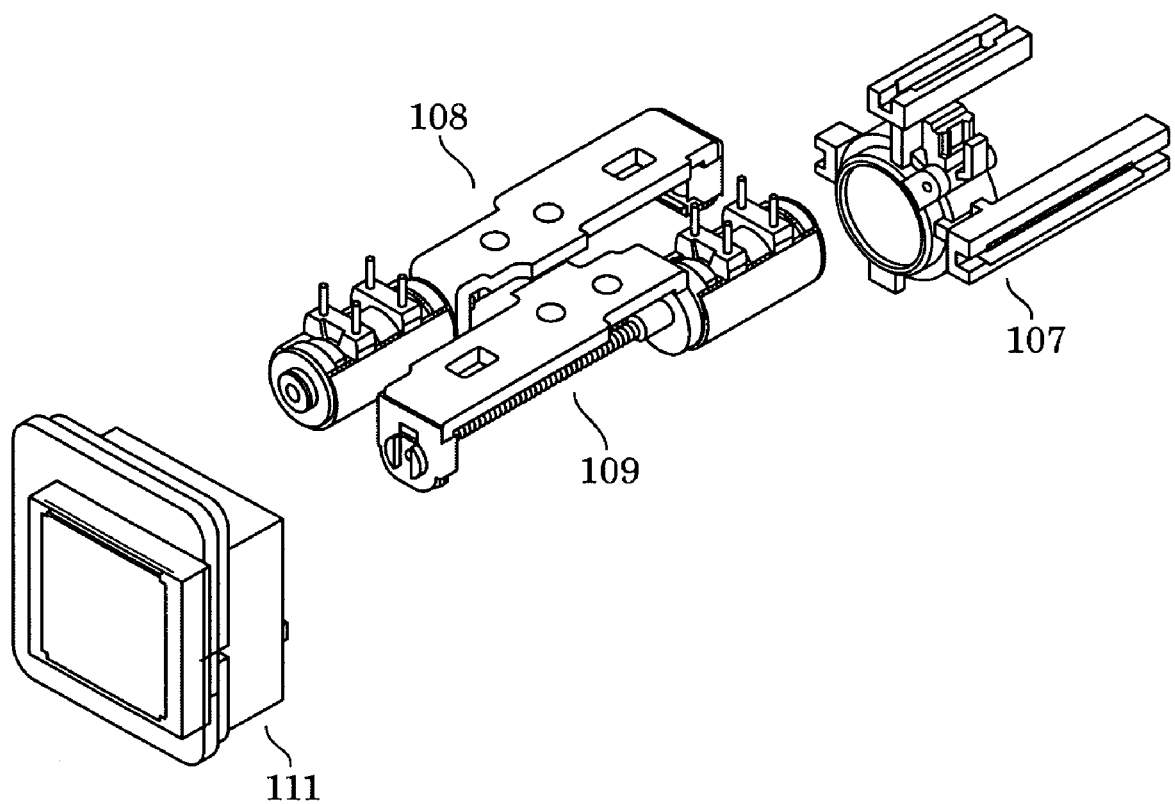
FIG. 8 is an enlarged view of the back side of the exploded perspective view in FIG. 6.
Figure 9:
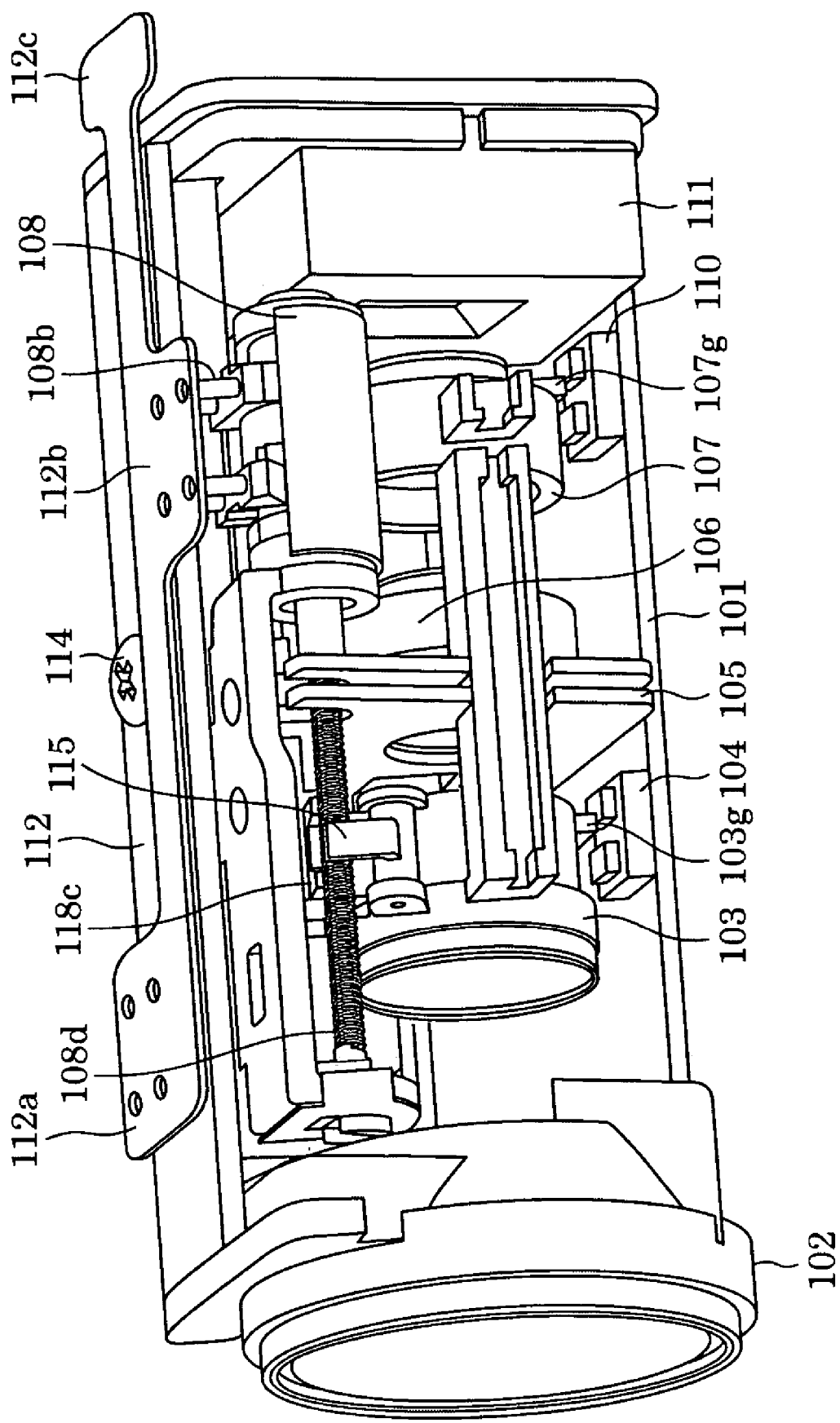
FIG. 9 is a perspective view of the internal structure of the first embodiment, illustrating a set-up state.

A first embodiment of the invention will be described below. FIG. 2 is a perspective view showing an appearance of the configuration of the entire lens barrel, FIG. 9 is a perspective cross-sectional view of the outer fixed barrel, and FIG. 3 is an exploded perspective view of the entire lens barrel.

First, referring to FIG. 1, an optical system built in this lens barrel will be described.

Figure 1:
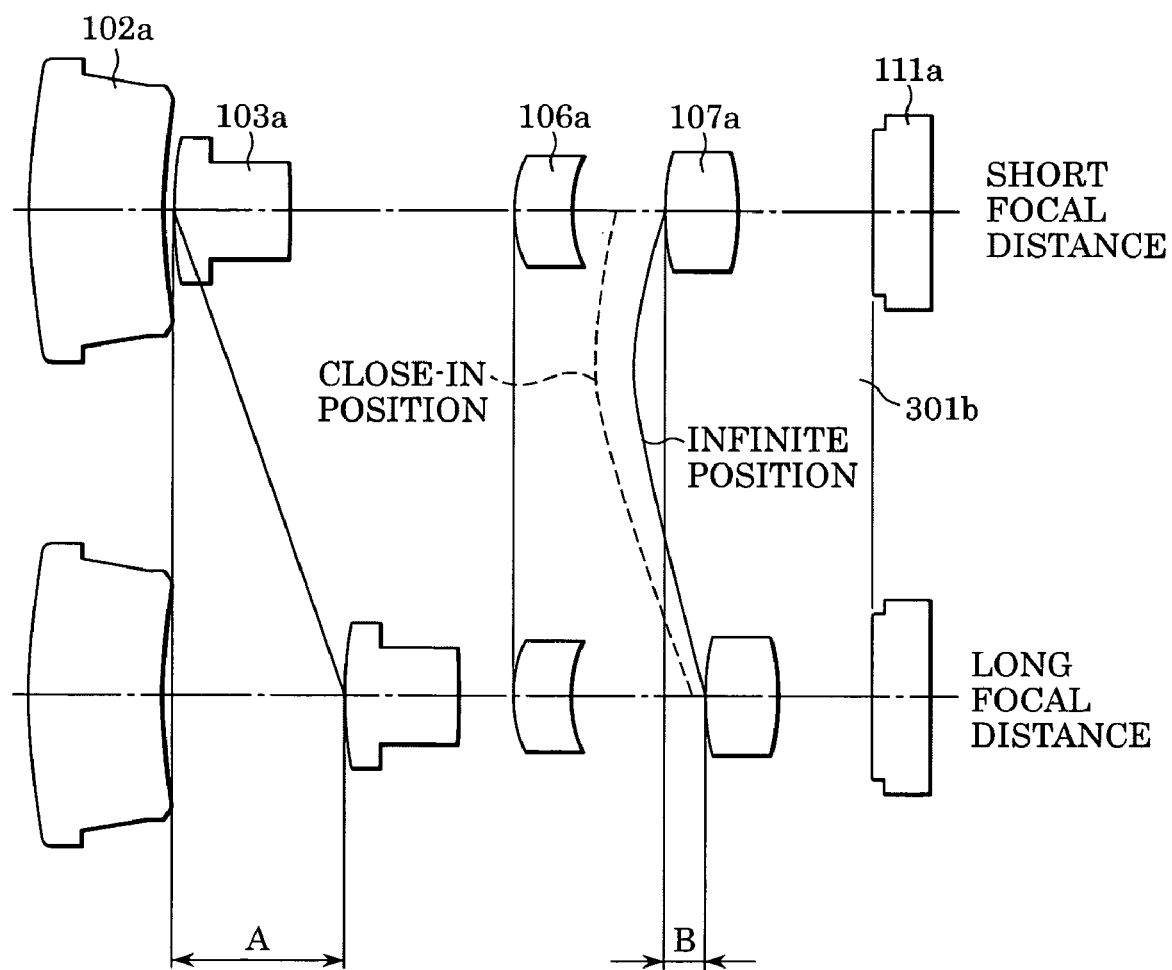
FIG. 1 is a drawing showing the configuration of a lens in a first embodiment.

FIG. 1 is a drawing showing the change caused by zooming of an optical lens. A first lens group 102a which is fixed to the lens barrel and hence is not capable of moving, a second lens group 103a for adjusting variable power, a third lens group 106a as an a focal lens which is fixed to the lens barrel and hence is not capable of moving and a fourth lens group 107a, which corresponds to a relay lens, for adjusting variable power and focusing.

The focal distance is changed by moving the second lens group 103a and the fourth lens group 107a, and the focusing is done by moving only the fourth lens group 107a.

FIG. 1 illustrates the positions of the respective lens groups when the lenses are in a short focal distance on the upper part, and the positions of the respective lens groups when the lenses are in the long focal distance on the lower part. Lines connecting the upper lens group and the lower lens group represent the movement of the respective lens groups. The maximum range of movement of the second lens group 103a is represented by A, and the maximum range of movement of the third lens group 106a is represented by B.

After having zoomed, the fourth lens group 107a moves between the infinite position represented by a solid line and the close-in position represented by a broken lines in the drawing according to the position of a subject to achieve focusing.

Referring now to FIG. 2, the appearance of the lens barrel will be described. In FIG. 2, a first lens group retaining frame 102 is fixed at the front of a fixed barrel 101 that supports the entire lens barrel, and a CCD holder 111 is fixed at the back of the fixed barrel 101. A Flexible Printed Circuit (FPC) 112 for driving and controlling integrated two stepping motors is disposed on the upper surface of the fixed barrel 101, and connected to a camera body (not shown yet) at a connecting portion 112c, so that the stepping motor is driven and controlled by a control unit in the camera body.

Figure 14:
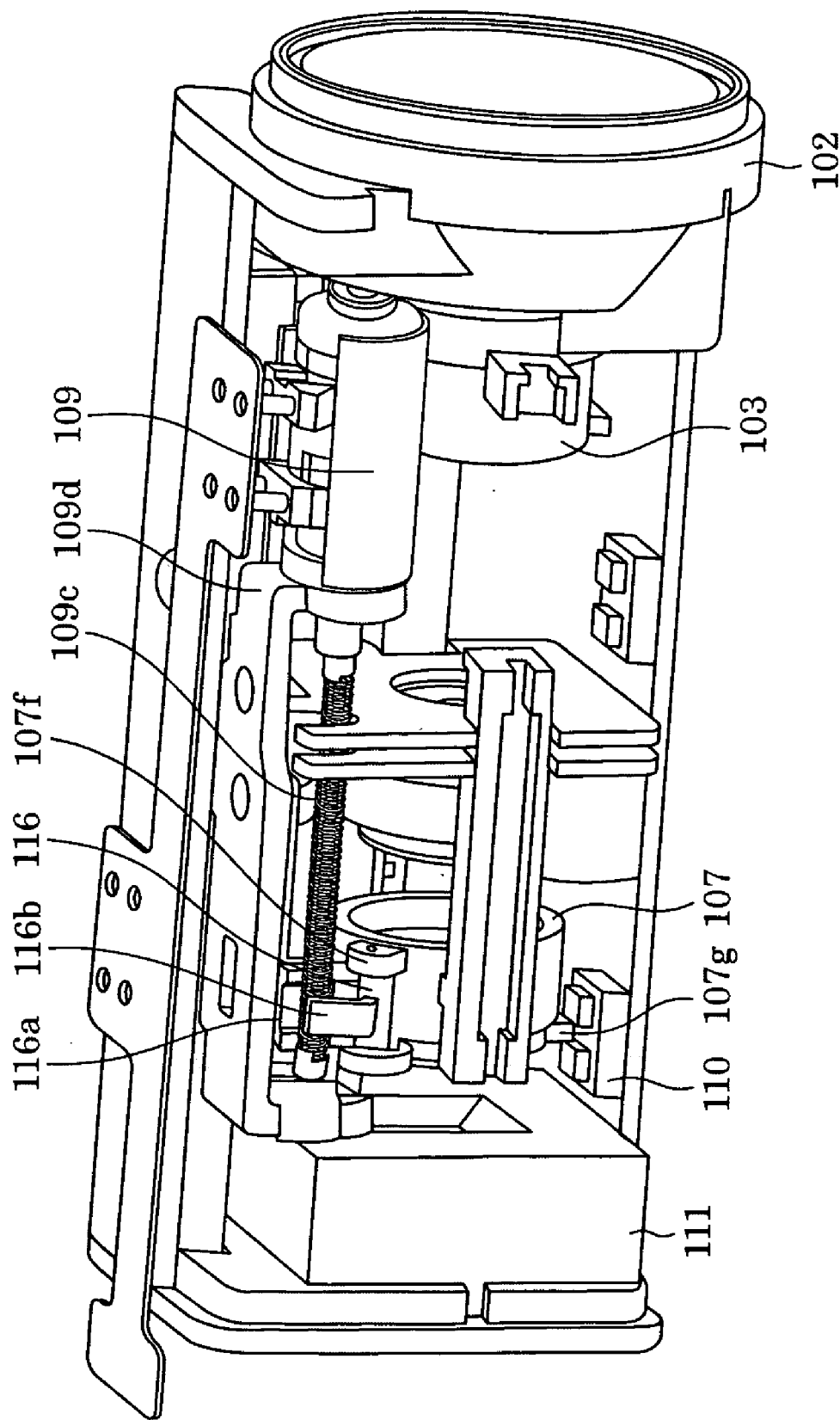
FIG. 14 is a perspective view of the internal structure of the first embodiment (for describing the fourth lens group retaining frame).

Referring now to FIG. 3, FIG. 9, and FIG. 14, the internal structure of the lens barrel will be described. FIG. 9 is a drawing of the cross section of the fixed barrel 101 of the lens barrel cut vertically to make the internal structure visible. The first lens group retaining frame 102 is fixed to the front (the side where the subject exists) of the fixed barrel 101, and then a second lens group retaining frame 103 is supported inside the fixed barrel 101 so as to be capable of moving forward and backward in the direction of the optical axis (how it is supported will be described later in detail).

A second lens group stepping motor 108 is fixed to the upper inner surface of the fixed barrel 101 by motor fixing screws 113 shown in FIG. 2.

A second lens group rack 115 rotatably fixed to the second lens group retaining frame 103 engages a lead screw 108c of the second lens group stepping motor 108 and moves the second lens group retaining frame 103 forward and backward in the direction of the optical axis by the rotation of the second lens group stepping motor.

A second lens group photo interrupter (PR) 104 is fixed to the lower inner surface of the fixed barrel 101, and optically detects penetration of a PR detector projection 103g of the second lens group retaining frame 103 in the direction of the optical axis.

An aperture mechanism 105 is fixed inside the fixed barrel 101, and controls the amount of light reaching the CCD adequately by moving an aperture blade, not shown, forward and backward in the optical path.

In FIG. 14, a fourth lens group stepping motor 109 is fixed to the upper inner surface of the fixed barrel 101 by a motor fixing screw 114 shown in FIG. 2.

A fourth lens group rack 116 rotatably fixed to a fourth lens group retaining frame 107 engages a lead screw 109c of a fourth lens group stepping motor 109, and moves the fourth lens group retaining frame 107 forward and backward in the direction of the optical axis by the rotation of the fourth lens group stepping motor.

A fourth lens group photo interrupter (PR) 110 is fixed to the lower inner surface of the fixed barrel 101, and optically detects penetration of a PR detector projection 107g of the fourth lens group retaining frame 107 in the direction of the optical axis.

The CCD holder 111 is fixed to the back of the fixed barrel 101, and the CCD sensor 111a for converting a subject image formed by the lens group into electric signals is integrated in the CCD holder.

Figure 12:
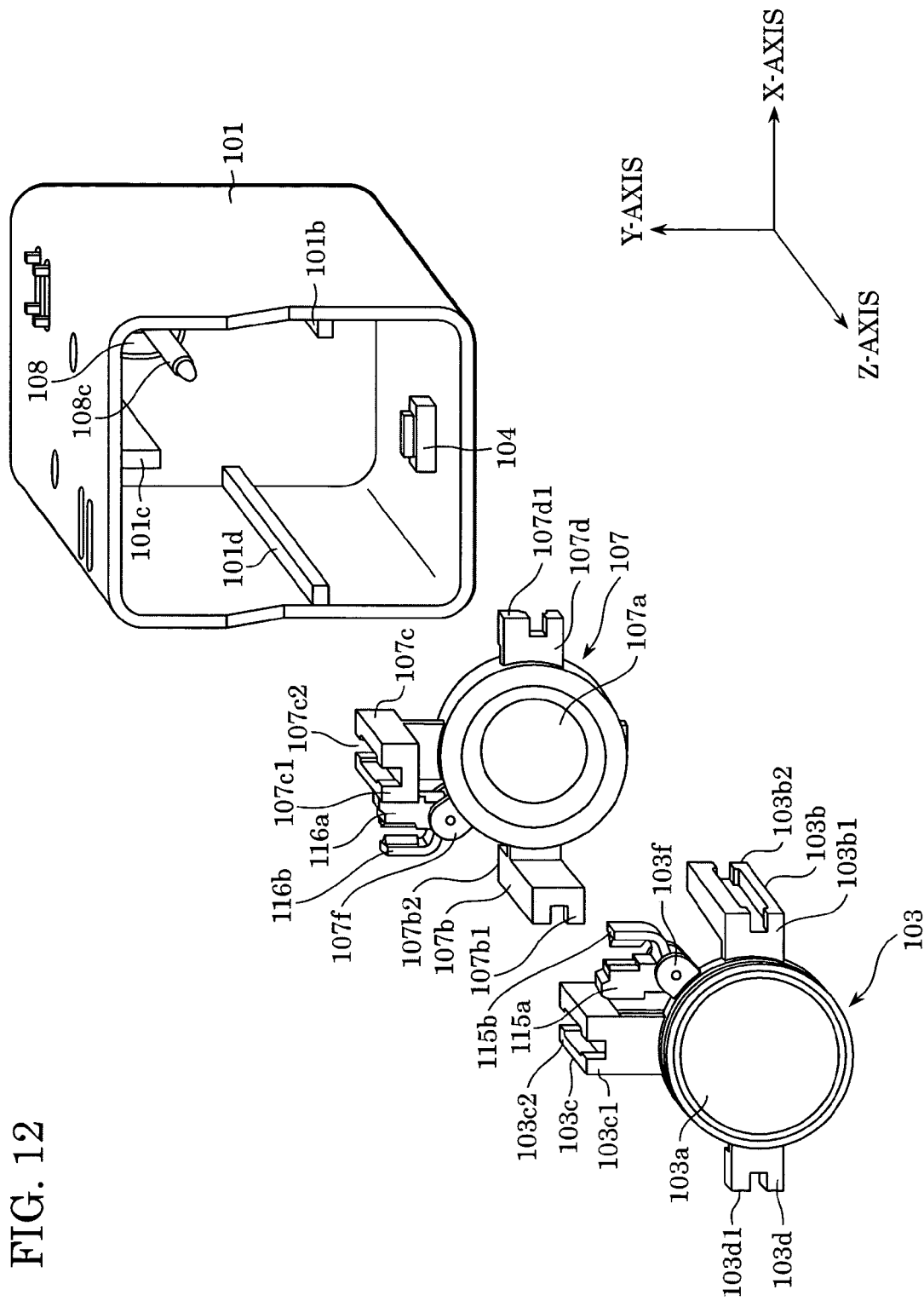
FIG. 12 is an exploded perspective view of a second and fourth lens group retaining frames and a fixed barrel in the first embodiment.
Figure 13:
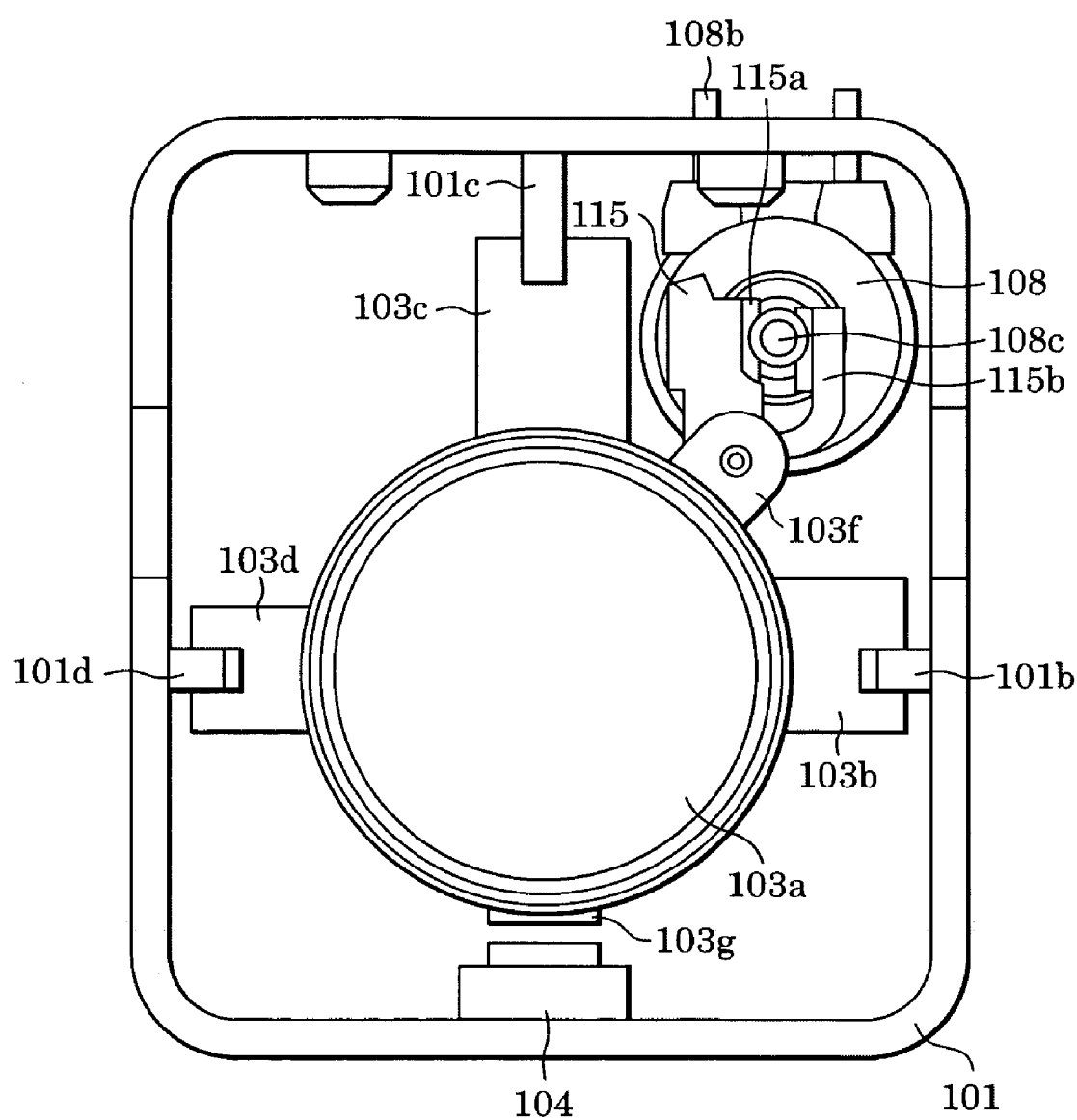

Referring now to FIG. 12 and FIG. 13, characteristic portions of the invention will be described in detail.

The structure of the fixed barrel 101 will be described. In FIG. 12, there are provided a first guiding member 101b on the right side, a second guiding member 101c on the upper side, a third guiding member 101d on the left side, when viewed from the front of the lens barrel, in parallel with the optical axis in the fixed barrel 101. These guiding members have a square shape of a uniform width. The second lens group stepping motor 108 is disposed at the upper right corner in the fixed barrel 101 (in FIG. 12, some of the components of the stepping motor are omitted so as to make the lead screw 108c visible for description).

The supporting structure of the second lens group retaining frame 103 will be described. The second lens group 103a, which moves forward and backward in the direction of the optical axis for zooming and changes the magnification of an image, is built-in at the center of the second lens group retaining frame 103. When viewed from the front, a first fitting arm 103b is disposed on the right side on the outer periphery of the second lens group retaining frame 103, and is formed with a recessed groove at the center thereof and projections 103b1, 103b2 extending inwardly of the groove from the front and back sides of the groove. These projections 103b1, 103b2 fit the first guiding member 101b on the fixed barrel described above.

A second fitting arm 103c is disposed on the upper portion of the outer periphery of the second lens group retaining frame 103 and is formed with a recessed groove at the center thereof and projections 103c1, 103c2 extending inwardly of the groove from the front and back side of the groove. These projections 103c1, 103c2 fit the second guiding member 101c on the fixed barrel described above. The distance between the two projections 103c1 and 103c2 of the second fitting arm is shorter than the distance between the two projections 103b1 and 103b2 of the first fitting arm.

A third fitting arm 103d is disposed on the left side of the outer periphery of the second lens group retaining frame 103, and is formed with a recessed groove at the center thereof. The thickness of the third fitting arm 103d in the direction of the optical axis is as thin as about 1 mm, and only the projection 103d1 fits the third guiding member 101d on the fixed barrel.

For the convenience of description, coordinate axes are set as follows; the direction of the optical axis toward the subject is set to be a plus Z-axis, the upward direction in the drawing is set to be a plus Y-axis, and the rightward direction in the drawing is set to be a plus X-axis.

In this manner, the translation in the direction of Y-axis and rotation about the X-axis of the second lens group retaining frame 103 is restricted by engagement of the first fitting arm 103b, which is the longest arm, and the first guiding member 101b. In addition, with additional engagement between the third fitting arm 103d, which is the shortest arm, and the third guiding member 101d, the rotation of the second lens group retaining frame 103 about the Z-axis is restricted.

The rotation about the Y-axis of the second lens group retaining frame 103 is restricted by additional engagement between the second fitting arm 103c and the second guiding member 101c.

As described above, the second lens group retaining frame is restricted so that only the movement in the direction of the Z-axis (optical axis) is freely allowed, and the translation in the different directions or the rotational movement is restricted by the three arms 103b, 103c, 103d of the second lens group retaining frame.

Subsequently, a mechanism for moving the second lens group retaining frame 103 forward and backward in the direction of the optical axis will be described. In FIG. 12, when viewing the lens barrel from the front, the rack fixing member 103f located on the upper right of the second lens group retaining frame 103 fixes the second group rack 115 so as to be capable of rotating about the axis extending in parallel with the optical axis.

In FIG. 13, an engaging tooth 115a of the second lens group rack 115 engages a lead screw 108c of the second lens group stepping motor 108, and a resilient tooth 115b having resiliency presses the lead screw 108c from the opposing direction toward the lead screw 108c. Consequently, the engaging tooth 115a and the resilient tooth 115b press against the lead screw 108c from the left and right sides, so that a state similar to fitting of generally used screw and nut is established. Therefore, when the second lens group stepping motor 108 rotates, the lead screw 108c connected directly to the motor rotates, and depending on the leading amount of the lead screw, the second lens group rack 115 is moved forward and backward in the direction of the optical axis, and the second lens group retaining frame 103 connected to the second lens group rack 115 is moved forward and backward in the direction of the optical axis, so that zooming operation is enabled.

Referring now to FIG. 12, the supporting structure of the fourth lens group retaining frame 107 will be described. The fourth lens group 107a which moves forward and backward in the direction of the optical axis for changing the magnification of the image for zooming, and moves forward and backward in the direction of the optical axis for focusing, is built in at the center of the fourth lens group retaining frame 107. When viewed from the front, a first fitting arm 107b is disposed on the left side of the outer periphery of the fourth lens group retaining frame 107 and is formed with a recessed groove at the center thereof and projections 107b1, 107b2 projecting inwardly of the groove from the front side and the back side of the groove. These projections 107b1, 107b2 fit the third guide member 101d on the fixed barrel described above.

A second fitting arm 107c is disposed on the upper portion of the outer periphery of the fourth lens group retaining frame 107, and is formed with a recess at the center thereof and projections 107c1, 107c2 projecting inwardly of the groove from the front side and the back side of the recess. These projections 107c1, 107c2 fit the second guiding member 101c of the fixed barrel described above. The distance between the two projections 107c1 and 107c2 of the second fitting arm is shorter than the distance between the two projections 107b1 and 107b2 of the first fitting arm.

A third fitting arm 107d is disposed on the right side of the outer periphery of the fourth lens group retaining frame 107, and is formed with a recess at the center thereof. The thickness of the third fitting arm 107d in the direction of the optical axis is as thin as about 1 mm, and only the projection 107d1 fits the first guide member 101b on the fixed barrel.

In this manner, the translation in the direction of Y-axis and rotation about the X-axis of the third lens group retaining frame 107 is restricted by engagement of the first fitting arm 103b, which is the longest arm, and the third guiding member 101d. In addition, with additional engagement between the third fitting arm 107d, which is the shortest arm, and the first guiding member 101b, the rotation of the fourth lens group retaining frame 107 about the Z-axis is restricted.

The rotation about the Y-axis of the fourth lens group retaining frame 107 is restricted by additional engagement between the second fitting arm 107c and the second guiding member 101c.

As described above, the fourth lens group retaining frame is restricted so that only the movement in the direction of the Z-axis (optical axis) is freely allowed, and the translation in the different directions or the rotational movement is restricted by the three arms 107b, 107c, 107d of the fourth lens group retaining frame.

Subsequently, a mechanism for moving the fourth lens group retaining frame 107 forward and backward in the direction of the optical axis will be described. In FIG. 14, the fourth lens group rack 116 rotatably fixed about the axis extending in parallel with the optical axis of a rack fixing portion 107f of the fourth lens retaining frame 107 is shown.

An engaging tooth 116a of the fourth lens group rack 116 engages a lead screw 109c of the fourth lens group stepping motor 109, and a resilient tooth 116b having resiliency presses the lead screw 109c from the opposing direction toward the lead screw 109c. Consequently, the engaging tooth 116a and the resilient tooth 116b press against the lead screw 109c from the left and right sides, so that a state similar to fitting of generally used screw and nut is established. Therefore, when the fourth lens group stepping motor 109 rotates, the lead screw 109c connected directly to the motor rotates, and depending on the leading amount of the lead screw, the fourth lens group rack 116 is moved forward and backward in the direction of the optical axis, and the fourth lens group retaining frame 107 connected to the fourth lens group rack 116 is moved forward and backward in the direction of the optical axis, so that zooming operation or focusing operation are enabled.

Subsequently, a mechanism for detecting the amount of movement of the second lens group retaining frame 103 and the fourth lens group retaining frame 107 from the infinite position will be described. For example, it is assumed that the lenses are in the shot focal distance, and the user turned off the power of the camera and then turned on the power of the camera for taking pictures again. The lens barrel is required to detect the initial positions of the second lens group retaining frame 103 and the fourth lens group retaining frame 107 for calculating the positions to be moved for subsequent zooming or focusing operation.

Figure 10:
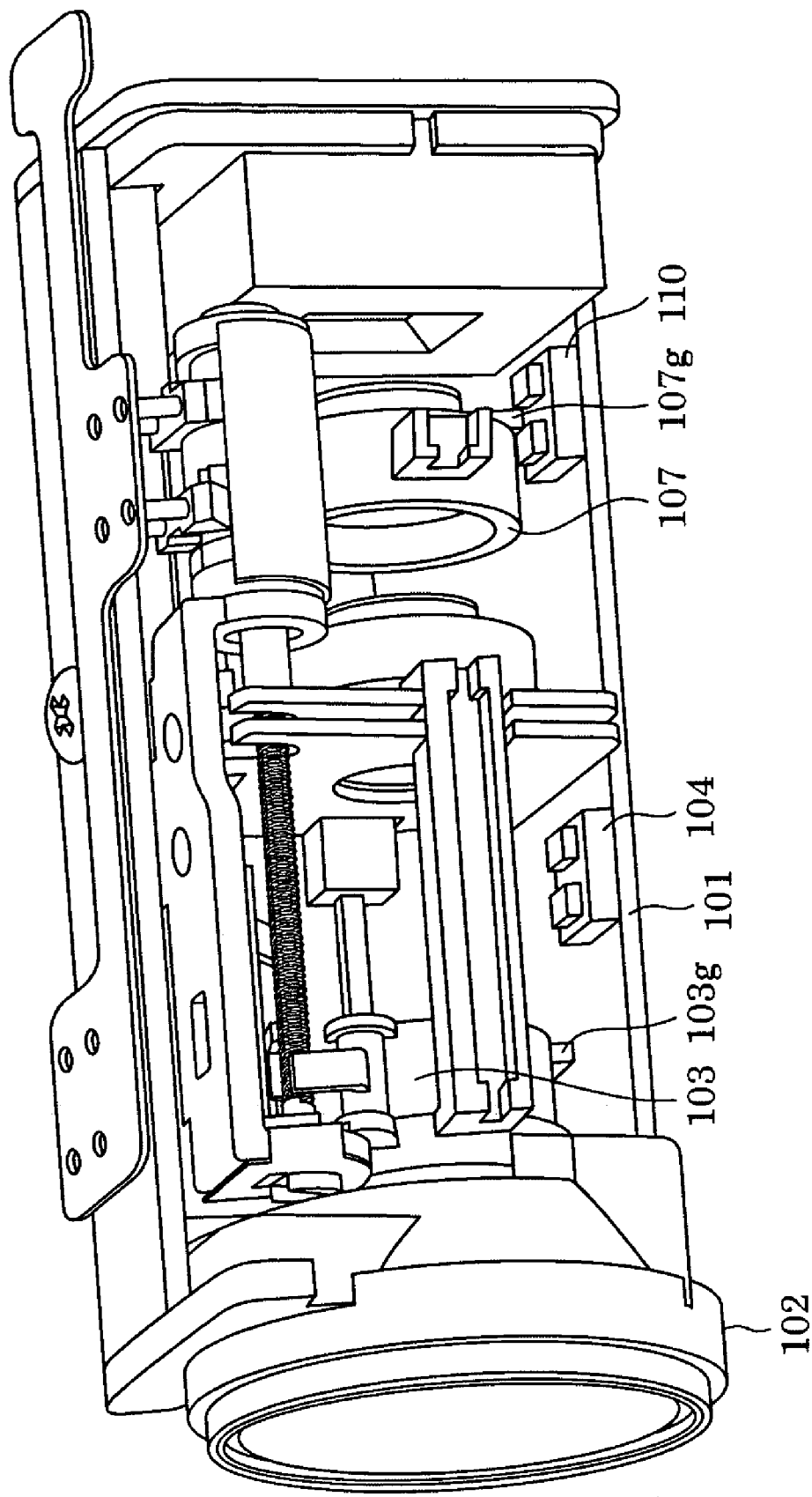
FIG. 10 is a perspective view of the internal structure of the first embodiment, illustrating a state set for the short focal distance.
Figure 11:
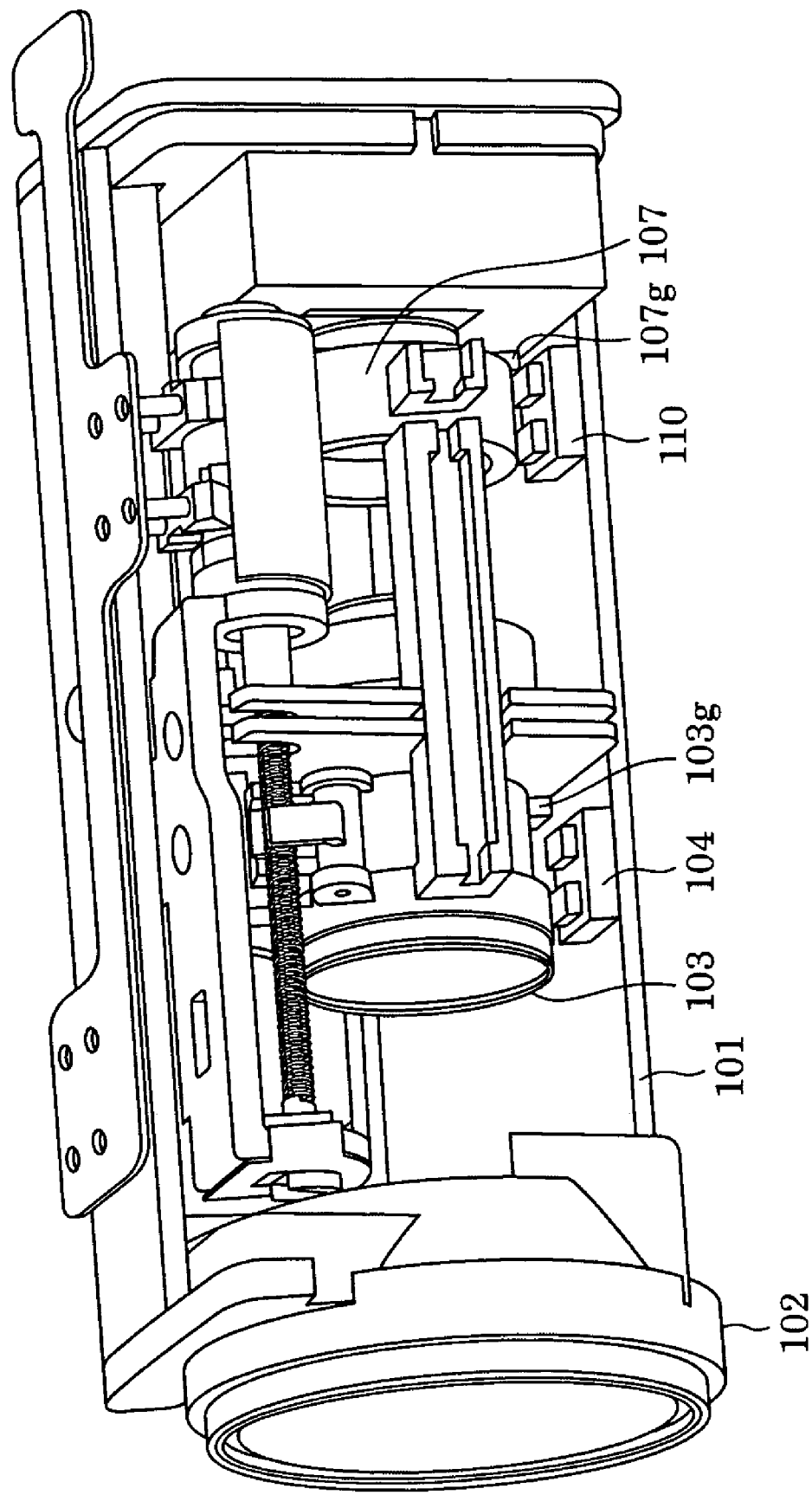
FIG. 11 is a perspective view of the internal structure of the first embodiment, illustrating a state set for the long focal distance.

At the moment when the power of the camera is turned on again, the second lens group retaining frame 103 and the fourth lens group retaining frame 107 are located at the positions of short focal distance as shown in FIG. 10.

Therefore, the second lens group stepping motor 108 is driven to move the second lens group retaining frame 103 backward in the direction of the optical axis, and when the PR detector projection 103g of the second lens group retaining frame 103 passes over the second lens group PR (photo interrupter) 104 and the second lens group PR 104 detects its passage as shown in FIG. 9, the second lens group retaining frame 103 is stopped once. Immediately after this, the second lens group retaining frame 103 is moved forward, and when the second lens group PR 104 detects the passage of the PR detector projection 103g of the second lens group retaining frame 103 again, the control unit in the camera starts counting the number of steps of the second lens group stepping motor 108. The counted number corresponds to the position of the optical axis of the second lens group retaining frame 103 from the position of the second lens group PR 104. Then, when the counted number reaches a predetermined number which corresponds to the position of the short focal distance, the second lens group stepping motor 108 is stopped and the state shown in FIG. 10 is achieved. This operation enables the second lens group retaining frame 103 to stop at the position of short focal distance accurately and makes the position of the second lens group retaining frame 103 controllable by the counted number even during subsequent forward and backward movement thereof.

The fourth lens group retaining frame 107, in the same manner as the second lens group retaining frame 103, drives the fourth lens group stepping motor 109 to move the fourth lens group retaining frame 107 backward in the direction of the optical axis and, when the PR detector projection 107g of the fourth lens group retaining frame 107 passes over the fourth lens group PR (photo interrupter) 110 and the fourth lens group PR 110 detects its passage as shown in FIG. 9, the fourth lens group retaining frame 107 is stopped once. Immediately after this, the fourth lens group retaining frame 107 is moved forward, and when the fourth lens group PR 110 detects the passage of the PR detector projection 107g of the fourth lens group retaining frame 107 again, the control unit in the camera starts counting the number of steps of the fourth lens group stepping motor 109. The counted number corresponds to the position of the optical axis of the fourth lens group retaining frame 107 from the position of the fourth lens group PR 110. Then, when the counted number reaches a predetermined number which corresponds to the position of the short focal distance, the fourth lens group stepping motor 109 is stopped and the state shown in FIG. 10 is achieved. This operation enables the fourth lens group retaining frame 107 to stop at the position of short focal distance accurately and makes the position of the fourth lens group retaining frame 107 controllable by the counted number even during subsequent forward and backward movement thereof.

A characteristic effect of the first embodiment is that since the guiding member is unitary with the fixed barrel from the front end to the rear end, rigidity of the guiding member increases, and the supporting accuracy of the lens retaining frame increases.

Second Embodiment

Figure 15:
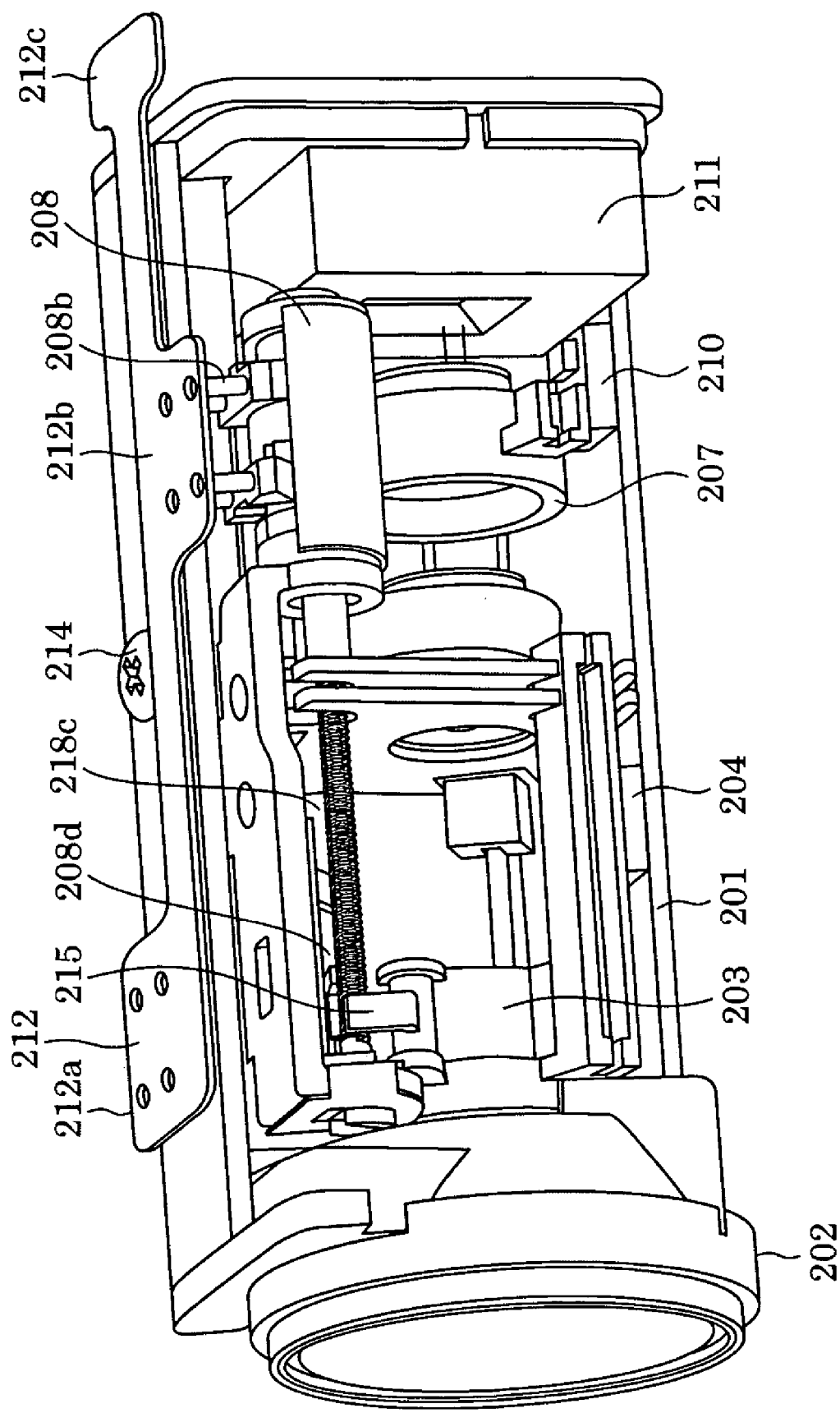
FIG. 15 is a perspective view of the internal structure of a second embodiment.
Figure 16:
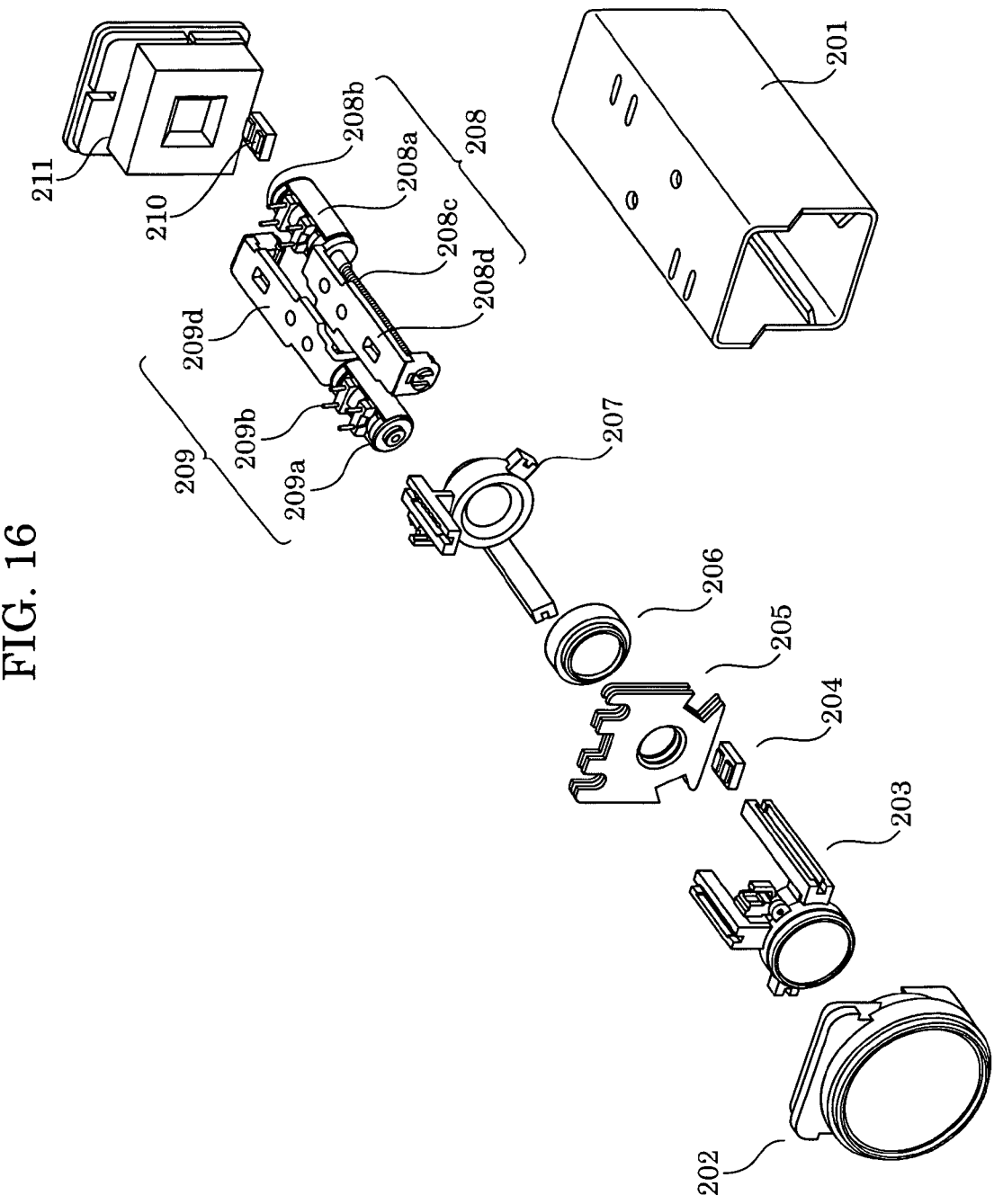
FIG. 16 is an exploded perspective view of the second embodiment.

A second embodiment of the invention will be described below. FIG. 15 is a perspective cross-sectional view obtained by cutting the fixed barrel on the outer side, and FIG. 16 is an exploded perspective view of the entire lens barrel.

Figure 17:
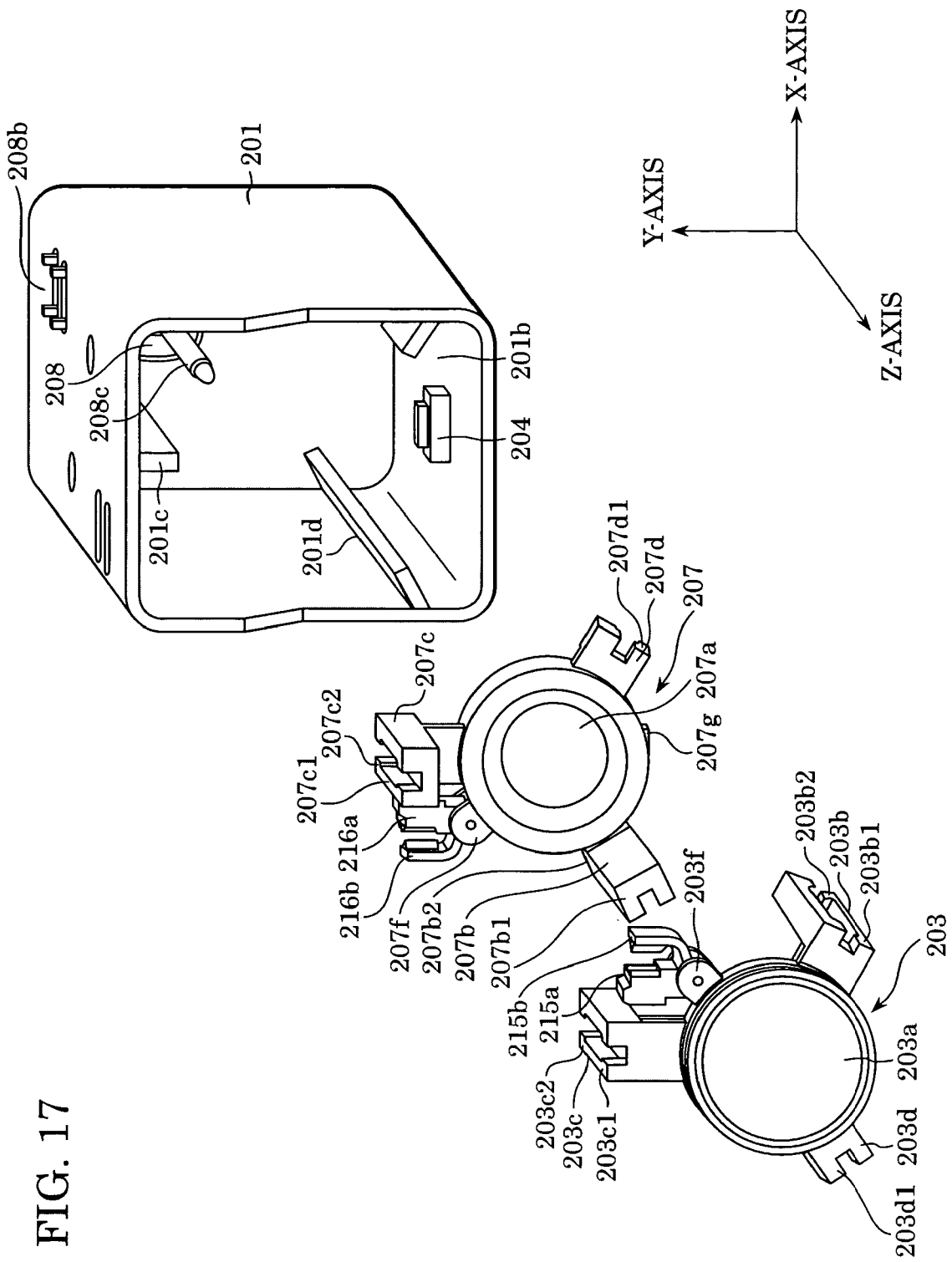
FIG. 17 is an exploded perspective view of the second and fourth lens group retaining frames and the fixed barrel in the second embodiment.

FIG. 17 is an exploded perspective view of the second lens group retaining frame, the fourth lens group retaining frame, and the fixed barrel for explaining characteristics of the second embodiment.

Figure 18:
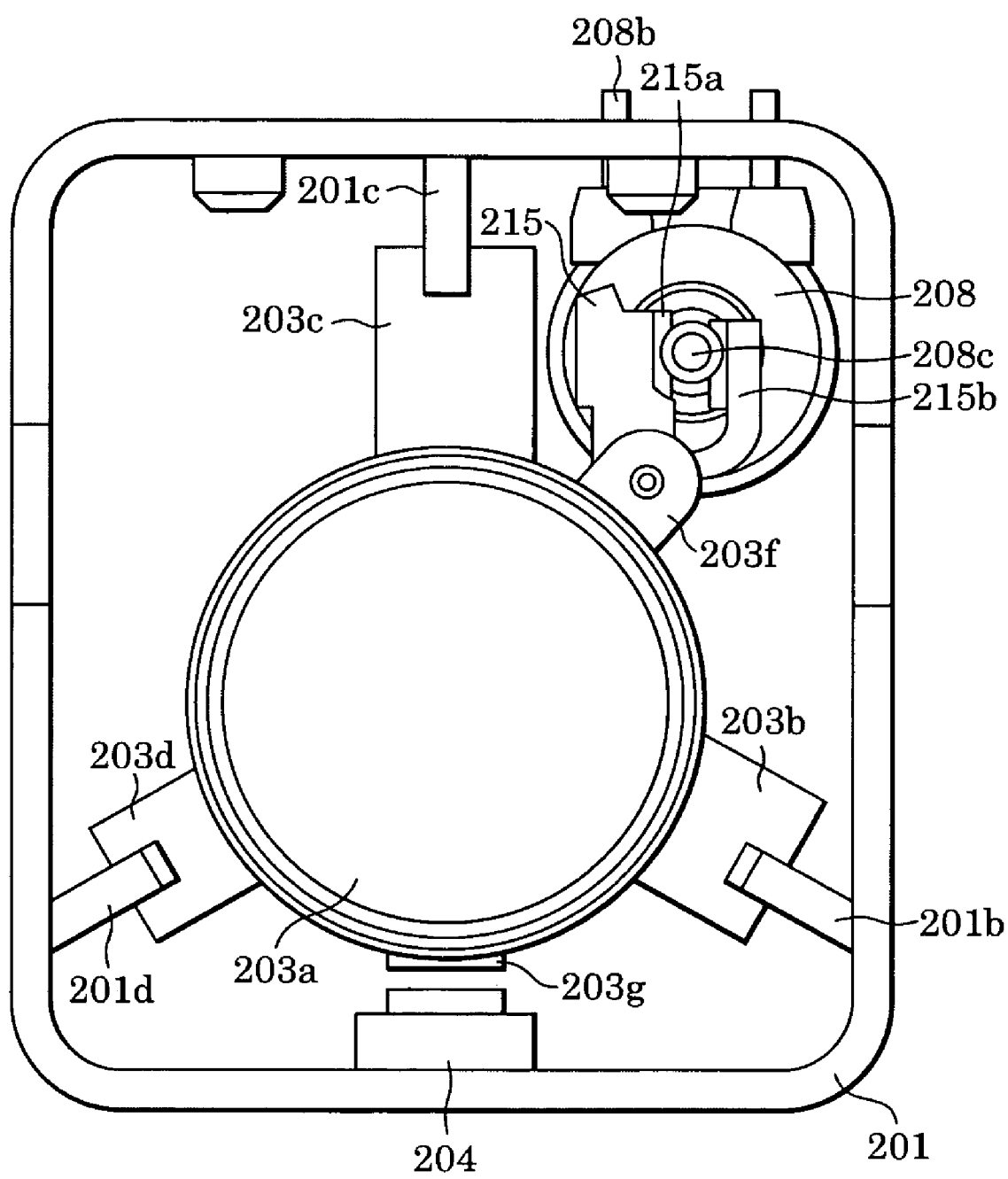

FIG. 18 is a front view of the second lens group retaining frame, the fourth lens group retaining frame, the fixed barrel, and the second lens group stepping motor for explaining characteristics of the second embodiment.

Since the optical system built in the second embodiment is identical to the first embodiment shown in FIG. 1, and the operation during zooming and focusing is the same as in the first embodiment, the description will not be repeated again.

Referring to FIG. 17 and FIG. 18, the characteristic portions of the second embodiment will be described in detail. Here, only points which are different from the first embodiment will be described.

The structure of a fixed barrel 201 will be described. In the fixed barrel 201, a second guiding member 201c is disposed on the upper side in the fixed barrel 201, a first guiding member 201b is disposed at a position turned clockwise by 120°, and a third guiding member 201d is disposed at a position turned clockwise further by 120° when viewing the lens barrel from the front, so as to extend in parallel with the optical axis and have a square shape of a uniform width. A second lens group stepping motor 208 is disposed on the upper right corner inside the fixed barrel 201 (in FIG. 18, some of the components of the stepping motor are omitted so as to make the lead screw 208c visible for description).

The supporting structure of a second lens group retaining frame 203 will now be described. The second lens group 203a which moves forward and backward in the direction of the optical axis and changes the magnification of an image for zooming is built in at the center of the second lens group retaining frame 203. When viewed from the front, a first fitting arm 203b is disposed at 120° on the lower right portion of the outer periphery of the second lens group retaining frame 203, and is formed with a recessed groove at the center thereof and projections 201b1, 203b2 projecting inwardly of the groove from the front side and the rear side of the groove. These projections 203b1, 203b2 fit the first guiding member 201b of the fixed barrel described above. A second fitting arm 203c is disposed on the upper part of the outer periphery of the second lens group retaining frame 203, and is formed with a recessed groove at the center thereof and projections 203c1 and 203c2 projecting inwardly of the groove from the front side and the back side of the groove. These projections 203c1, 203c2 fit the second guiding member 201c of the fixed barrel described above. The distance between the two projections 203c1 and 203c2 of the second fitting arm is shorter than the distance between the two projections 203b1 and 203b2 of the first fitting arm. A third fitting arm 203d is disposed at 120° on the lower left portion of the outer periphery of the second lens group retaining frame 103, and is formed with a recessed groove at the center thereof. The thickness of the third fitting arm 203d in the direction of the optical axis is as thin as about 1 mm, and only a projection 203d1 fits the third guiding member 201d of the fixed barrel.

For the convenience of description, coordinate axes are set as follows; the direction of the optical axis toward the subject is set to be a plus Z-axis, the upward direction in the drawing is set to be a plus Y-axis, and the rightward direction in the drawing is set to be a plus X-axis.

In this manner, by the engagement between the first fitting arm 203b, which is the longest arm, and the first guiding member 101b, the second lens group retaining frame 203 is restricted in translation in a second direction which is vertical both to "a first direction directed from the optical axis to the first fitting arm" and "Z-axis", and also in rotation about the first direction.

Furthermore, rotation about the Z-axis of the second lens group retaining frame 203 is restricted by additional engagement between the third fitting arm 203d, which is the shortest arm, and the third guiding member 201d.

Rotation of the second lens group retaining frame 203 about the second direction is restricted by additional engagement between the second fitting arm 203c and the second guiding member 201c.

As described above, the second lens group retaining frame is restricted so that only the movement in the direction of the Z-axis (optical axis) is freely allowed, and the translation in the different directions or the rotational movement is restricted by the three arms 203b, 203c, 203d of the second lens group retaining frame.

The supporting structure of a fourth lens group retaining frame 207 will be described. A fourth lens group 207a that moves forward and backward in the direction of optical axis to change the magnification of an image for zooming and moves forward and backward in the direction of optical axis for focusing is built in at the center of the fourth lens group retaining frame 207. When viewed from the front, a first fitting arm 207b is disposed at 120° on the lower left portion of the outer periphery of the fourth lens group retaining frame 207, and is formed with a recessed groove at the center thereof and projections 207b1, 207b2 projecting inwardly of the groove from the front side and the back side of the groove. These projections 207b1, 207b2 fit the third guiding member 201d of the fixed barrel described above. A second fitting arm 207c is disposed on the upper portion of the outer periphery of the fourth lens group retaining frame 207 and is formed with a recessed groove at the center thereof and projections 207c1, 207c2 projecting inwardly of the groove from the front side and the rear side of the groove. These projections 207c1, 207c2 fit the second guiding member 201c of the fixed barrel described above. The distance between the two projections 207c1 and 207c2 of the fourth fitting arm is shorter than the distance between the two projections 207b1 and 207b2 of the first fitting arm. A third fitting arm 207d is disposed at 120° on the lower right portion of the outer periphery of the second lens group retaining frame 107, and is formed with a recessed groove at the center thereof. The thickness of the third fitting arm 207d in the direction of the optical axis is as thin as about 1 mm, and only a projection 207d1 fits the first guiding member 201b of the fixed barrel.

For the convenience of description, coordinate axes are set as follows; the direction of the optical axis toward the subject is set to be a plus Z-axis, the upward direction in the drawing is set to be a plus Y-axis, and the rightward direction in the drawing is set to be a plus X-axis.

In this manner, by the engagement between the first fitting arm 207b, which is the longest arm, and the third guiding member 101d, the fourth lens group retaining frame 207 is restricted in translation in a second direction which is vertical both to "a first direction directed from the optical axis to the first fitting arm" and "Z-axis", and also in rotation about the first direction.

Furthermore, rotation about the Z-axis of the fourth lens group retaining frame 207 is restricted by additional engagement between the third fitting arm 207d, which is the shortest arm, and the first guiding member 201b.

Rotation of the fourth lens group retaining frame 207 about the second direction is restricted by additional engagement between the second fitting arm 207c and the second guiding member 201c.

As described above, the fourth lens group retaining frame is restricted so that only the movement in the direction of the Z-axis (optical axis) is freely allowed, and the translation in the different directions or the rotational movement is restricted by the three arms 207b, 207c, 207d of the fourth lens group retaining frame.

A characteristic effect of the second embodiment is that since the guiding member is unitary with the fixed barrel from the front end to the rear end, rigidity of the guiding member increases, and the supporting accuracy of the lens retaining frame increases.

Third Embodiment

Figure 19:
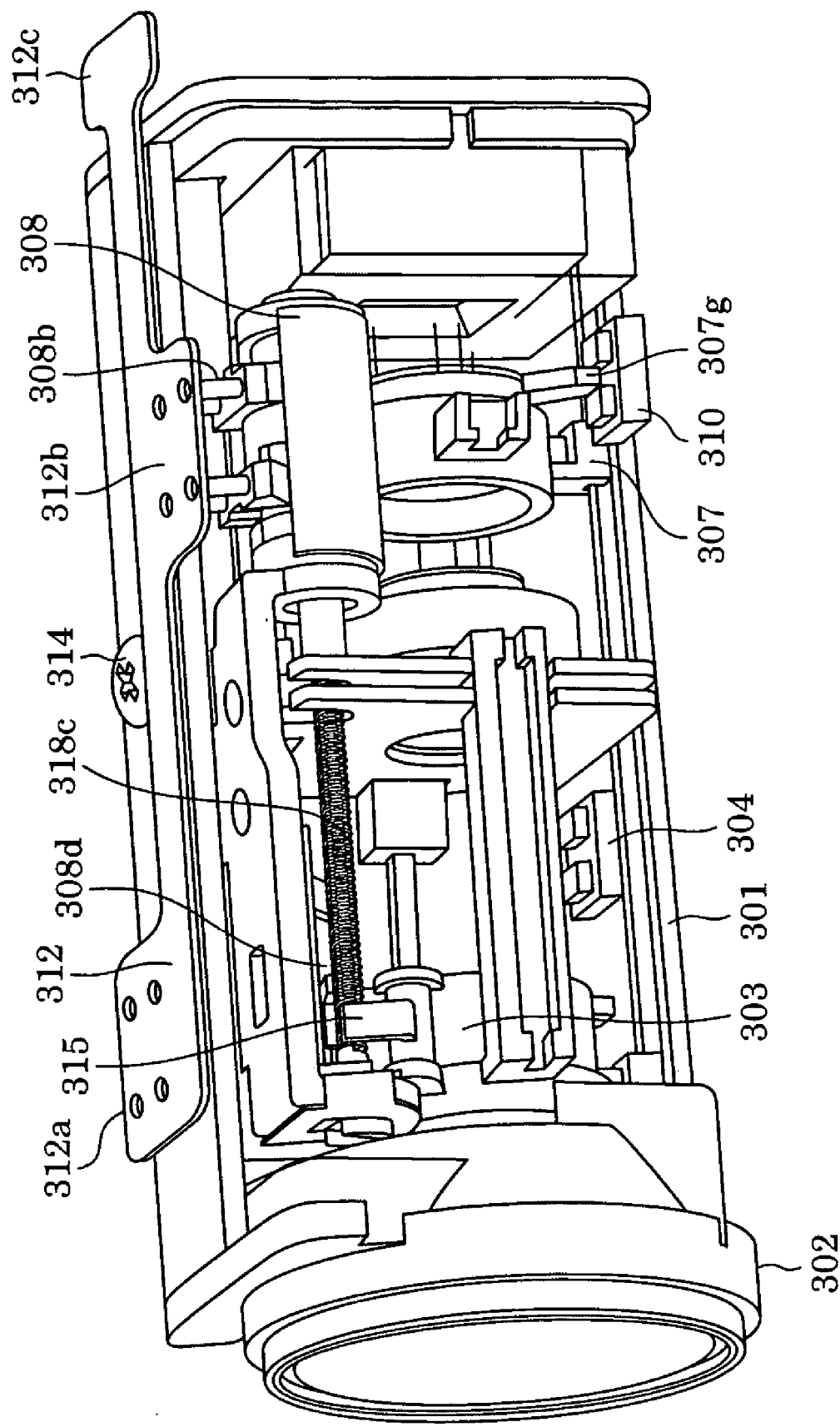
FIG. 19 is a perspective view of the internal structure of a third embodiment.
Figure 20:
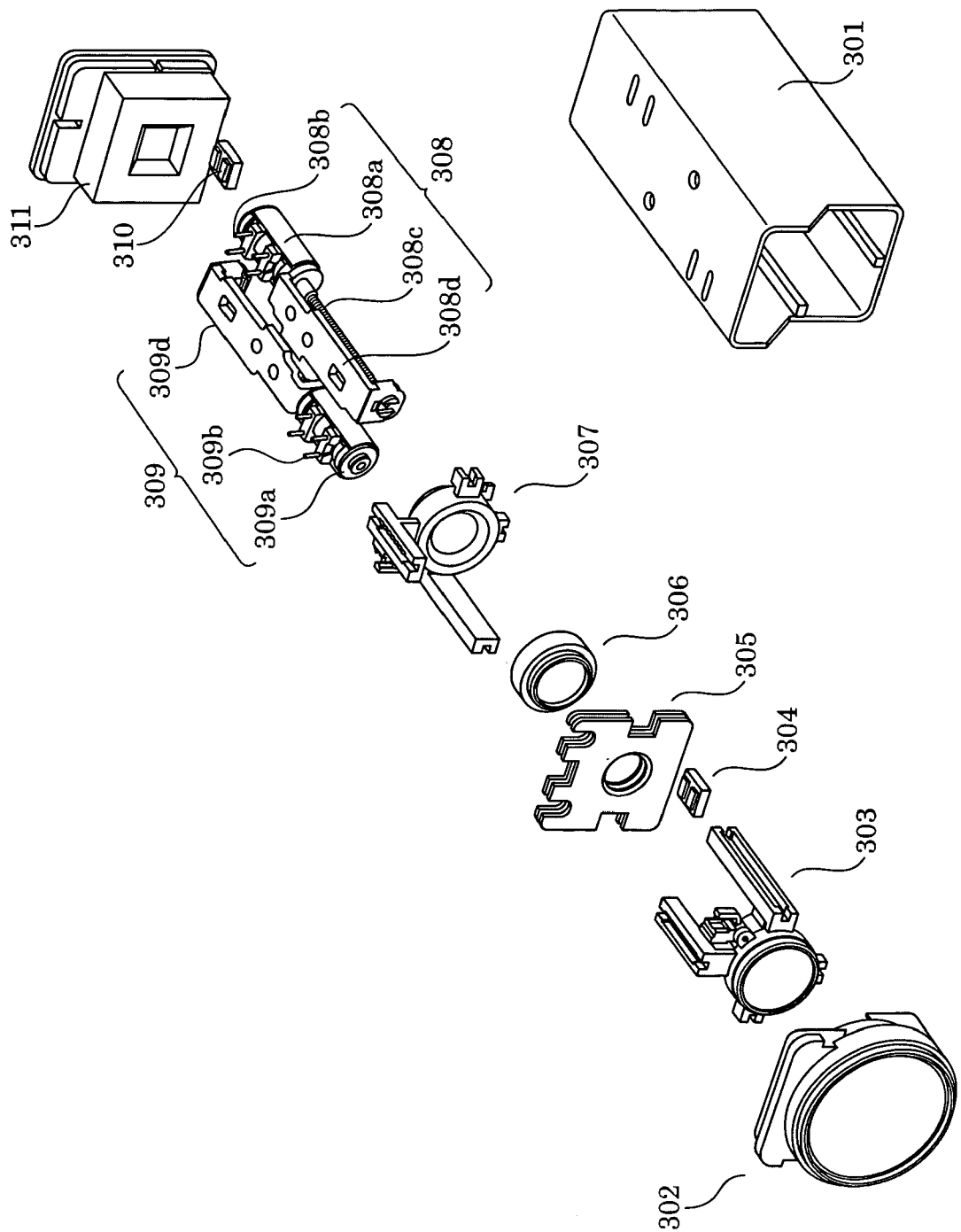
FIG. 20 is an exploded perspective view of the third embodiment.

A third embodiment of the invention will be described below. FIG. 19 is a perspective cross-sectional view obtained by cutting the fixed barrel on the outer side, and FIG. 20 is an exploded perspective view of the entire lens barrel.

Figure 21:
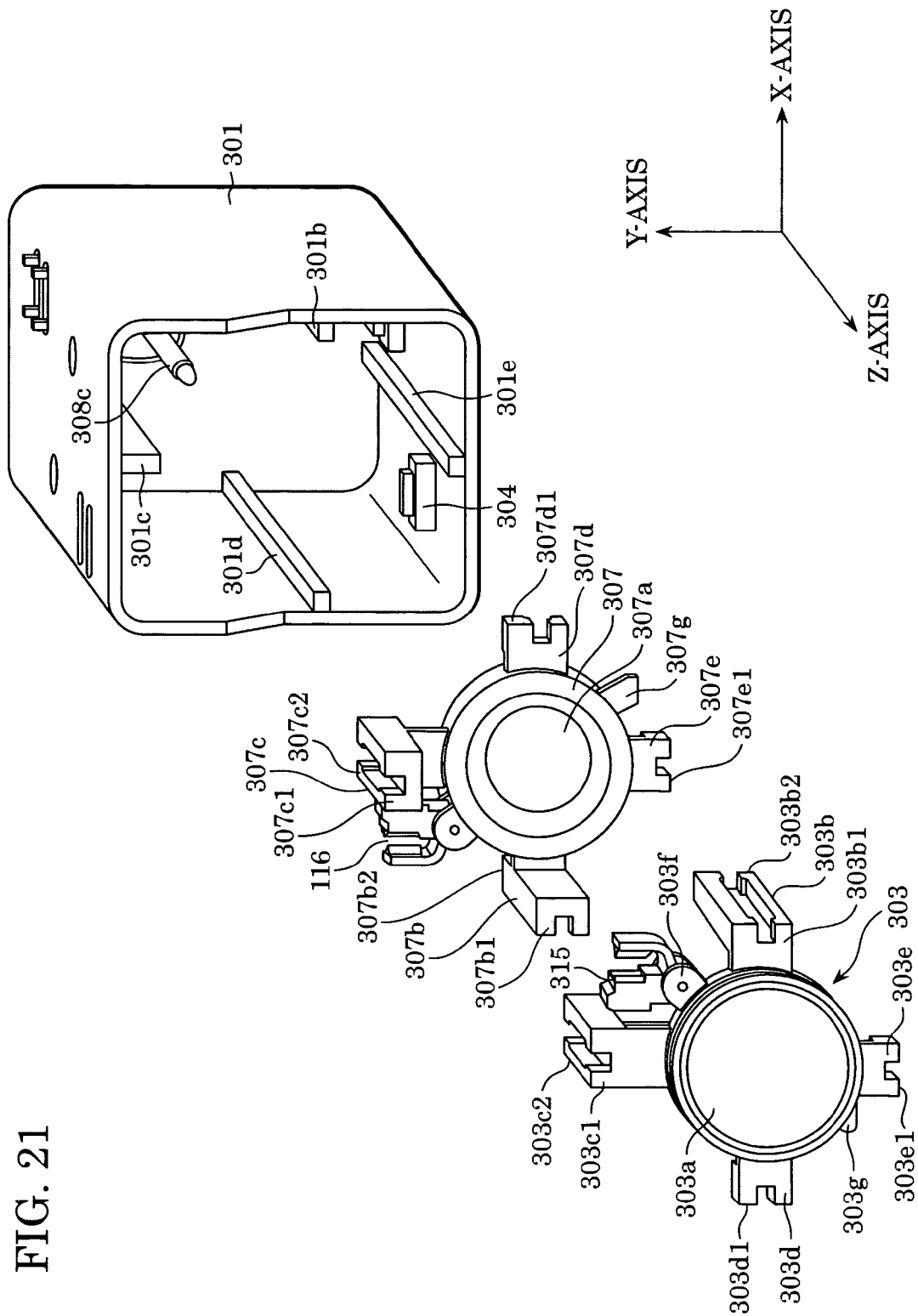
FIG. 21 is an exploded perspective view of the second and fourth lens group retaining frames in the third embodiment.

FIG. 21 is an exploded perspective view of the second lens group retaining frame, the fourth lens group retaining frame, and the fixed barrel for explaining characteristics of the third embodiment.

Figure 22:
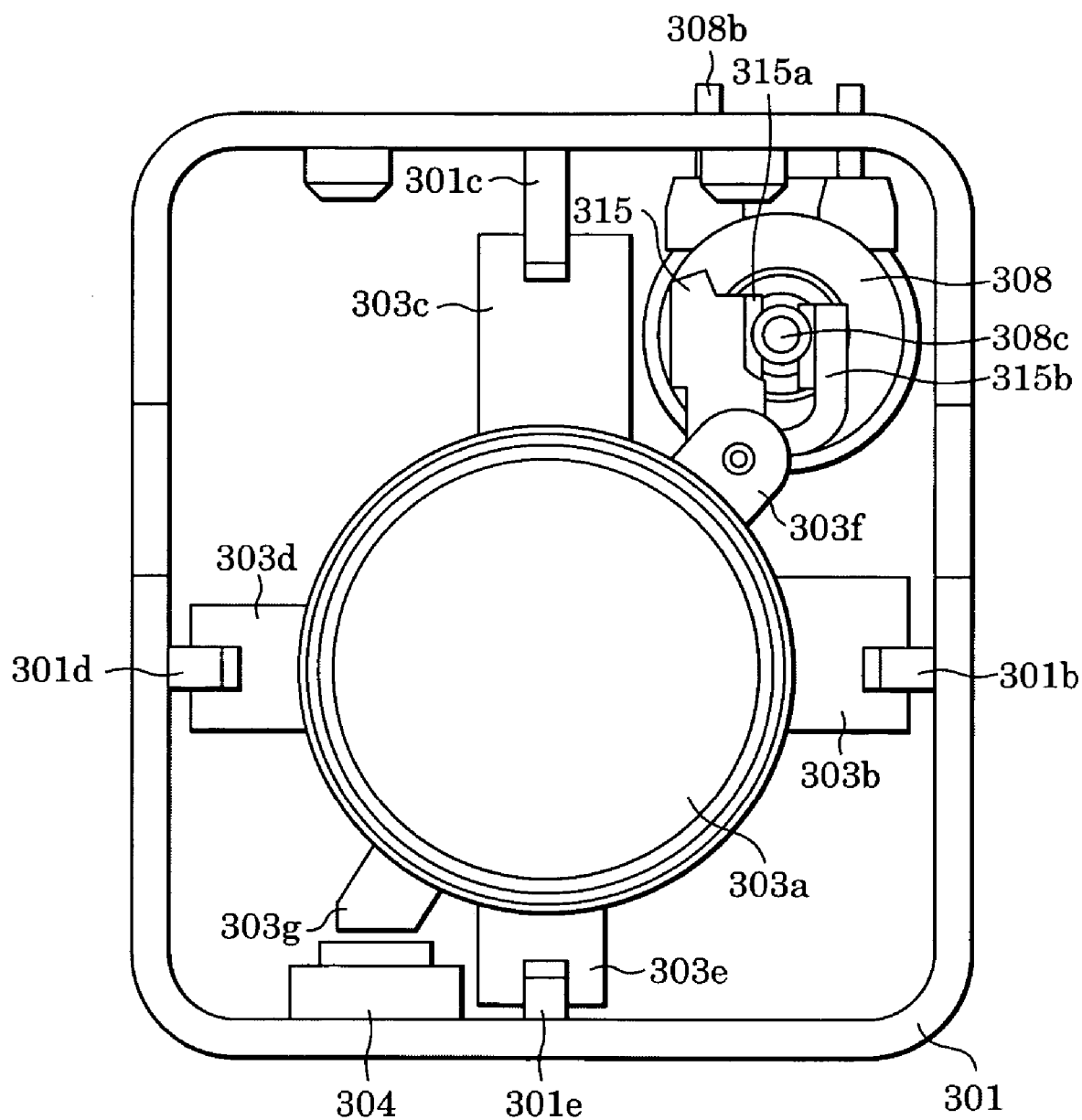

FIG. 22 is a front view of the second lens group retaining frame, the fourth lens group retaining frame, the fixed barrel, and the second lens group stepping motor for explaining characteristics of the third embodiment.

Since the optical system built in the third embodiment is identical to the first embodiment shown in FIG. 1, and the operation during zooming and focusing is the same as in the first embodiment, the description will not be repeated again.

Referring to FIG. 21 and FIG. 22, the characteristic portions of the third embodiment will be described in detail. Here, only points which are different from the first embodiment will be described.

The structure of the fixed barrel 301 will be described. In FIG. 21, a first guiding member 301b is disposed on the right side, a second guiding member 301c is disposed on the upper side, a third guiding member 301d is disposed on the left side, and a fourth guiding member 301e is disposed on the lower side in the fixed barrel 301 when viewing the lens barrel from the front so as to extend in parallel with the optical axis and have a square shape of a uniform width. A second lens group stepping motor 308 is disposed on the upper right corner inside the fixed barrel 301 (in FIG. 21, some of the components of the stepping motor are omitted so as to make a lead screw 308c visible for description).

The supporting structure of a second lens group retaining frame 303 will now be described. The second lens group 303a which moves forward and backward in the direction of the optical axis and changes the magnification of an image for zooming is built in at the center of the second lens group retaining frame 303. When viewed from the front, a first fitting arm 303b is disposed on the right side of the outer periphery of the second lens group retaining frame 303, and is formed with a recessed groove at the center thereof and projections 303b1, 303b2 projecting inwardly of the groove from the front side and the rear side of the groove. These projections 303b1, 303b2 fit the first guiding member 301b on the fixed barrel described above.

A second fitting arm 303c is disposed on the upper portion of the outer periphery of the second lens group retaining frame 303, and is formed with a recessed groove at the center thereof and projections 303c1, 303c2 projecting inwardly of the groove from the front side and the back side of the groove. These projections 303c1, 303c2 fit the second guiding member 301c of the fixed barrel described above. The distance between the two projections 303c1 and 303c2 of the second fitting arm is shorter than the distance between the two projections 303b1 and 303b2 of the first fitting arm.

A third fitting arm 303d is disposed on the left side of the outer periphery of the second lens group retaining frame 303 and is formed with a recessed groove at the center thereof. The thickness of the third fitting arm 303d in the direction of the optical axis is as thin as about 1 mm, and only a projection 303d1 fits the third guiding member 301d of the fixed barrel. A fourth fitting arm 303e is disposed on the lower portion of the outer periphery of the second lens group retaining frame 303, and is formed with a recessed groove at the center thereof. The thickness of the fourth fitting arm 303e in the direction of the optical axis is as thin as about 1 mm, and only the projection 303e1 fits the fourth guiding member 301e of the fixed barrel.

For the convenience of description, coordinate axes are set as follows; the direction of the optical axis toward the subject is set to be a plus Z-axis, the upward direction in the drawing is set to be a plus Y-axis, and the rightward direction in the drawing is set to be a plus X-axis.

In this manner by the engagement between the first fitting arm 303b, which is the longest arm, and the first guiding member 301b, and between the third fitting arm 303d, which is the shortest arm, and the third guiding member 301d, movement is restricted to a Z-X plane.

Furthermore, by the engagement between the second fitting arm 303c, which is the second longest arm and the second guiding member 301c, and between the fourth fitting arm 303e, which is the shortest arm, and the fourth guiding member 301e, movement is restricted to a Z-Y plane.

As described above, the second lens group retaining frame is restricted so that only the movement in the direction of the Z-axis (optical axis) is freely allowed, and the translation in the different directions or the rotational movement is restricted by the four arms 303b, 303c, 303d, 303e of the second lens group retaining frame.

The supporting structure of a fourth lens group retaining frame 307 will be described in FIG. 21. A fourth lens group 307a that moves forward and backward in the direction of optical axis to change the magnification of an image for zooming and moves forward and backward in the direction of optical axis for focusing is built in at the center of the fourth lens group retaining frame 307. When viewed from the front, the first fitting arm 307b is disposed on the left side of the outer periphery of the fourth lens group retaining frame 307, and is formed with a recessed groove at the center thereof, and projections 307b1, 307b2 projecting inwardly of the groove from the front side and the back side of the groove. These projections 307b1, 307b2 fit the third guiding member 301d of the fixed barrel described above.

A second fitting arm 307c is disposed on the upper portion of the outer periphery of the fourth lens group retaining frame 307 and is formed with a recessed groove at the center thereof and projections 307c1, 307c2 projecting inwardly of the groove from the front side and the rear side of the groove. These projections 307c1, 307c2 fit the second guiding member 301c of the fixed barrel described above. The distance between the two projections 307c1 and 307c2 of the second fitting arm is shorter than the distance between the two projections 307b1 and 307b2 of the first fitting arm.

A third fitting arm 307d is disposed on the right side of the outer periphery of the fourth lens group retaining frame 307, and is formed with a recessed groove at the center thereof. The thickness of the third fitting arm 307d in the direction of the optical axis is as thin as about 1 mm, and only a projection 307d1 fits the first guiding member 301b of the fixed barrel.

A fourth fitting arm 307e is disposed on the lower side of the outer periphery of the fourth lens group retaining frame 307, and is formed with a recessed groove at the center thereof. The thickness of the fourth fitting arm 307e in the direction of the optical axis is as thin as about 1 mm, and only a projection 307e1 fits the fourth guiding member 301e of the fixed barrel.

In this manner, by the engagement between the first fitting arm 307b, which is the longest arm, and the third guiding member 301d, and between the third fitting arm 307d, which is the shortest arm and the third guiding member 301d, movement is restricted to the Z-X plane.

Furthermore, by the engagement between the second fitting arm 307c, which is the second longest arm, and the second guiding member 301, and between the fourth fitting arm 307e, which is the shorter arm, and the fourth guiding member 301e, movement is restricted to the Z-Y plane.

As described above, the fourth lens group retaining frame is restricted so that only the movement in the direction of the Z-axis (optical axis) is freely allowed, and the translation in the different directions or the rotational movement is restricted by the three arms 307b, 307c, 307d, 307e of the fourth lens group retaining frame.

A characteristic effect of the third embodiment is that since the guiding member is unitary with the fixed barrel from the front end to the rear end, rigidity of the guiding member increases, and the supporting accuracy of the lens retaining frame increases.

Fourth Embodiment

Figure 23:
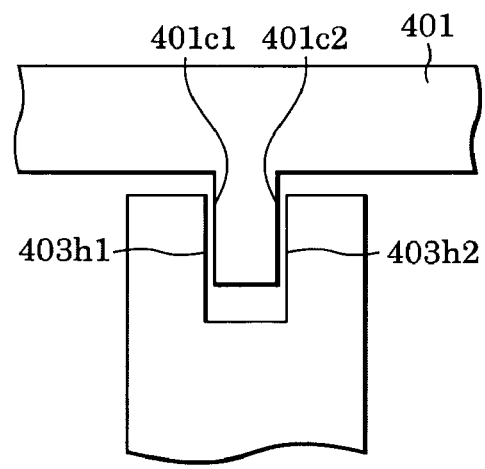
FIG. 23 is an enlarged view of a lens retaining frame fitting portion and a fixed barrel guiding member in a fourth embodiment.

Referring to FIG. 23, a fourth embodiment of the invention will be described below.

FIG. 23 is an enlarged front view of the fourth embodiment characterized by the shape of the fitting portion of the lens retaining frame and the shape of the guiding member of the fixed barrel. A guiding member 401c on a fixed barrel 402 is shaped like an elongated rail extending in the direction of the optical axis with a uniform width and having flat portions 401c1, 401c2 on the left and right sides. A second fitting arm 403c of the second lens group retaining frame is formed with a recessed groove on top thereof, and with flat portions 403h1, 403h2 on the left and right sides thereof.

The guiding member 401c and the second fitting arm 403c engage with each other by contact between the flat portion 401c1 of the guiding member 401c and the flat portion 403h1 of the fitting arm, and between the flat portion 401c2 of the guiding member 401c and the flat portion 403h2 of the fitting arm.

In this manner, since contact between the flat surfaces is provided, engagement being resistant for destruction or deformation against the external force is established.

Fifth Embodiment

Figure 24:
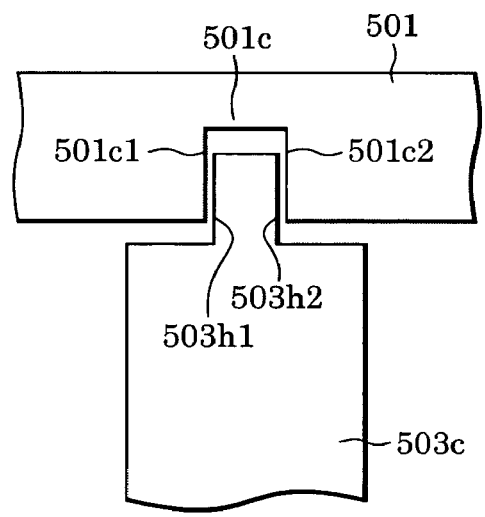
FIG. 24 is an enlarged view of the lens retaining frame fitting portion and the fixed barrel guiding member in a fifth embodiment.

Referring to FIG. 24, a fifth embodiment of the invention will be described below.

FIG. 24 is an enlarged front view of the fifth embodiment characterized by the shape of the fitting portion of the lens retaining frame and the shape of the guiding member of the fixed barrel. A guiding member 501c on a fixed barrel 501 is formed into an elongated groove extending in the direction of the optical axis with a uniform width and having flat portions 501c1, 501c2 on the left and light sides. A second fitting arm 503c of the second lens group retaining frame is formed with a rail-shaped projection on top thereof, and with flat portions 503h1, 503h2 on the left and right sides thereof.

Then, the guiding member 501c and the second fitting arm 503c engage with each other by contact between the flat portion 501c1 of the guiding member 501c and the flat portion 503h1 of the fitting arm, and between the flat portion 501c2 of the guiding member 501c and the flat portion 503h2 of the fitting arm.

In this manner, since contact between the flat surfaces is established, engagement being resistant for destruction or deformation against the external force is established.

Sixth Embodiment

Figure 25:
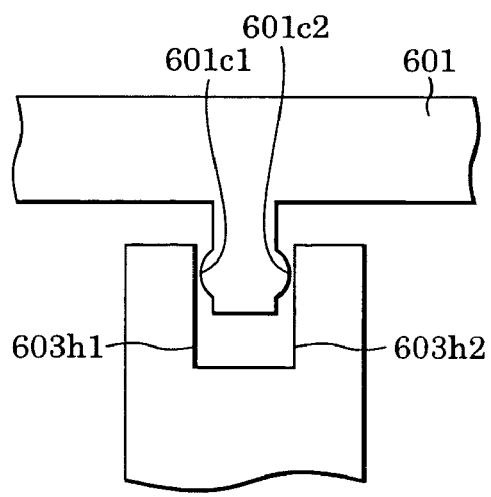
FIG. 25 is an enlarged view of the lens retaining frame fitting portion and the fixed barrel guiding member in a sixth embodiment.

Referring to FIG. 25, a sixth embodiment of the invention will be described below.

FIG. 25 is an enlarged front view of the sixth embodiment characterized by the shape of the fitting portion of the lens retaining frame and the shape of the guiding member of the fixed barrel. A guiding member 601c on a fixed barrel 601 is shaped like an elongated rail as a base extending in the direction of the optical axis with a uniform width and having projections 601c1, 601c2 formed on the left and right sides and extending in the direction of the optical axis. A second fitting arm 603c of the second lens group retaining frame is formed with a recessed groove on top thereof and flat portions 603h1, 603h2 on the left and right sides.

Then, the guiding member 601c and the second fitting arm 603c engage with each other by contact between the projection 601c1 of the guiding member 601c and the projection 603h1 of the fitting arm, and between the flat portion 601c2 of the guiding member 601c and the flat portion 603h2 of the fitting arm.

In this manner, since contact between the projection and the flat portion is established, the contact portion is clarified and reduced in contact area. Therefore, engagement with high degree of accuracy is established, and a frictional force is reduced when the second lens group retaining frame moves.

Seventh Embodiment

Figure 26:
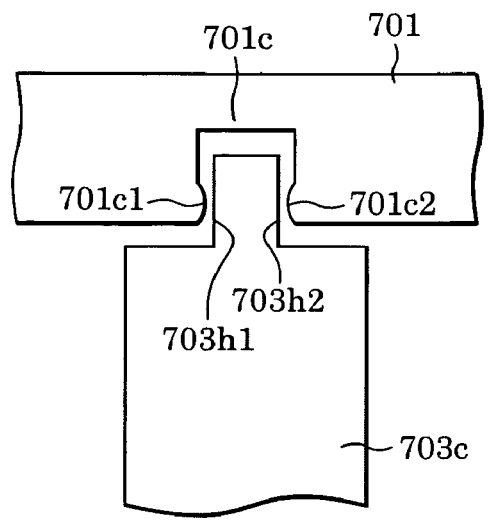
FIG. 26 is an enlarged view of the lens retaining frame fitting portion and the fixed barrel guiding member in a seventh embodiment.

Referring to FIG. 26, a seventh embodiment of the invention will be described below.

FIG. 26 is an enlarged front view of the seventh embodiment characterized by the shape of the fitting portion of the lens retaining frame and the shape of the guiding member of the fixed barrel. A guiding member 701c on a fixed barrel 701 is shaped like an elongated groove as a base extending in the direction of the optical axis with a uniform width and having projections 701c1, 701c2 formed on the left and right sides extending in the direction of the optical axis. A second fitting arm 703c of the second lens group retaining frame has a rail-shaped projection on top thereof, and flat portions 703h1, 703h2 on the left and right sides.

Then, the guiding member 701c and the second fitting arm 703c engage with each other by contact between the flat portion 701c1 of the guiding member 701c and the flat portion 703h1 of the fitting arm, and between the flat portion 701c2 of the guiding member 701c and the flat portion 703h2 of the fitting arm.

In this manner, since contact between the projection and the flat portion is established, the contact portion is clarified and reduced in contact area. Therefore, engagement with high degree of accuracy is established, and a frictional force is reduced when the second lens group retaining frame moves.

Eighth Embodiment

Figure 27:
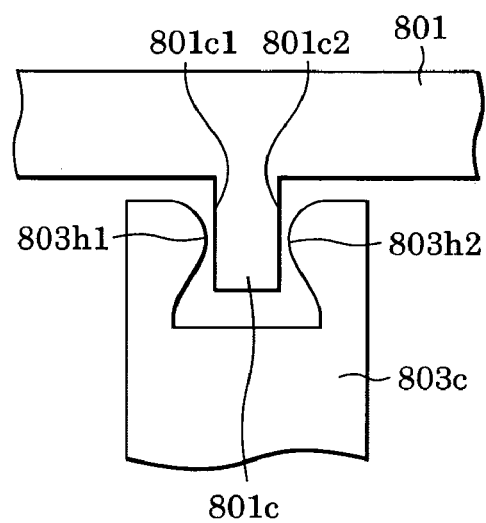
FIG. 27 is an enlarged view of the lens retaining frame fitting portion and the fixed barrel guiding member in an eighth embodiment.

Referring to FIG. 27, an eighth embodiment of the invention will be described below.

FIG. 27 is an enlarged front view of the eighth embodiment characterized by the shape of the fitting portion of the lens retaining frame and the shape of the guiding member of the fixed barrel. A guiding member 801c on a fixed barrel 801 is sh3aped like an elongated rail extending in the direction of the optical axis with a uniform width and having flat portions 801c1, 801c2 on the left and right sides. A second fitting arm 803c of the second lens group retaining frame is formed with a recess on top thereof, and projections 803h1, 803h2 on the left and right inner surfaces.

Then, the guiding member 801c and the second fitting arm 803c engage with each other by contact between the flat portion 801c1 of the guiding member 801c and the projection 803h1 of the fitting arm, and between the flat portion 801c2 of the guiding member 801c and the projection 803h2 of the fitting arm.

In this manner, since contact between the projection and the flat portion is established, the contact portion is clarified and reduced in contact area. Therefore, engagement with high degree of accuracy is established, and a frictional force is reduced when the second lens group retaining frame moves.

Ninth Embodiment

Figure 28:
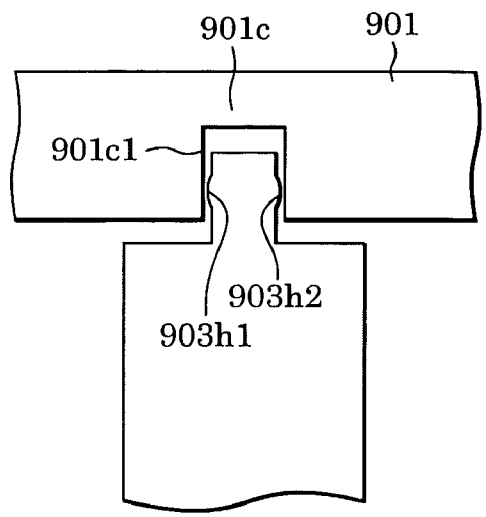
FIG. 28 is an enlarged view of the lens retaining frame fitting portion and the fixed barrel guiding member in a ninth embodiment.

Referring to FIG. 28, a ninth embodiment of the invention will be described below.

FIG. 28 is an enlarged front view of the ninth embodiment characterized by the shape of the fitting portion of the lens retaining frame and the shape of the guiding member of the fixed barrel. A guiding member 901c on a fixed barrel 901 is shaped like an elongated groove extending in the direction of the optical axis with a uniform width and having flat portions 901c1, 901c2 on the left and right sides thereof. A second fitting arm 903c of the second lens group retaining frame is formed with a rail-shaped projection on top thereof, and projections 903h1, 903h2 on the left and right sides.

Then, the guiding member 901c and the second fitting arm 903c engage with each other by contact between the flat portion 901c1 of the guiding member 901c and the projection 903h1 of the fitting arm and between the flat portion 901c2 of the guiding member 901c and the projection 903h2 of the fitting arm.

In this manner, since contact between the projection and the flat portion is established, the contact portion is clarified and reduced in contact area. Therefore, engagement with high degree of accuracy is established, and a frictional force is reduced when the second lens group retaining frame moves.

Tenth Embodiment

Figure 29:
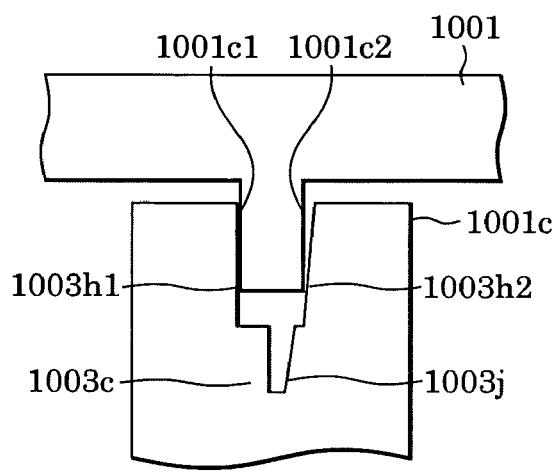
FIG. 29 is an enlarged view of the lens retaining frame fitting portion and the fixed barrel guiding member in a tenth embodiment.

Referring to FIG. 29, a tenth embodiment of the invention will be described below.

FIG. 29 is an enlarged front view of the tenth embodiment characterized by the shape of the fitting portion of the lens retaining frame and the shape of the guiding member of the fixed barrel. A guiding member 1001c on the fixed barrel 1001 is shaped like an elongated rail extending in the direction of optical axis with a uniform width and having flat portions 1001c1, 1001c2 on the left and right sides. A second fitting arm 1003c of the second lens group retaining frame is formed with a recessed groove on top thereof, and flat portions 1003h1, 1003h2 on the left and right sides. A slit 1003j is formed between the flat portions, and hence the flat portion 1003h2 is apt to resiliently approach the flat portion 1003h1.

Then, the guiding member 1001c and the second fitting arm 1003c engage with each other by contact between the flat portion 1001c1 of the guiding member 1001c and the flat portion 1003h1 of the fitting arm and pressurization of the flat portion 1001c2 of the guiding member 1001c against the flat portion 1003h2 of the fitting arm.

In this manner, since pressurization is established by a resilient force, engagement without rattling is enabled, and hence the lens retaining frame can be supported with high degree of accuracy.

Eleventh Embodiment

Figure 30:
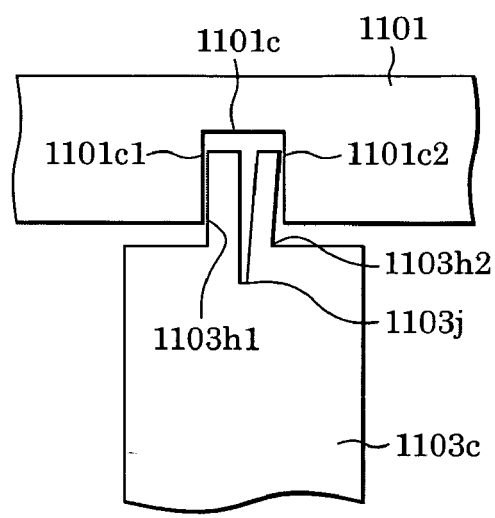
FIG. 30 is an enlarged view of the lens retaining frame fitting portion and the fixed barrel guiding member in an eleventh embodiment.

Referring to FIG. 30, an eleventh embodiment of the invention will be described below.

FIG. 30 is an enlarged front view of the eleventh embodiment characterized by the shape of the fitting portion of the lens retaining frame and the shape of the guiding member of the fixed barrel. A guiding member 1001c on a fixed barrel 1101 is shaped like an elongated groove extending in the direction of the optical axis with a uniform width and having flat portions 1101c1, 1101c2 on the left and right sides. A second fitting arm 1103c of the second lens group retaining frame is formed with a rail-shaped projection on top thereof, and flat portions 1103h1, 1103h2 on the left and right sides. A slit 1103j is formed between the flat portions and the flat portion 1103h2 is apt to move away from the flat portion 1103h1 by a resilient force.

Then, the guiding member 1101c and the second fitting arm 1103c engage with each other by contact between the flat portion 1103c1 of the guiding member 1101c and the flat portion 1103h1 of the fitting arm and between the flat portion 1101c2 of the guiding member 1101c and the flat portion 1103h2 of the fitting arm.

In this manner, since pressurization by a resilient force is established, engagement without rattling is enabled, and hence the lens retaining frame can be supported with high degree of accuracy.

Twelfth Embodiment

Figure 31:
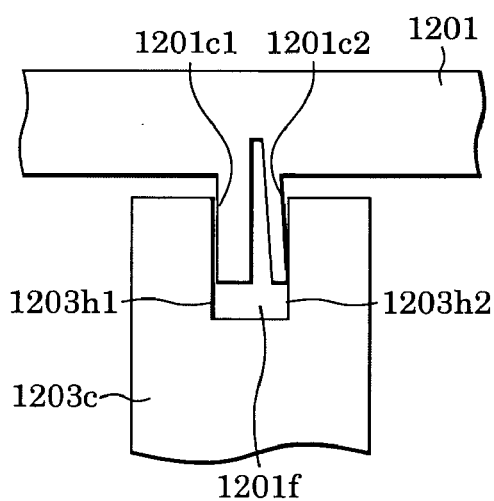
FIG. 31 is an enlarged view of the lens retaining frame fitting portion and the fixed barrel guiding member in a twelfth embodiment.

Referring to FIG. 31, the twelfth embodiment 12 of the invention will be described below.

FIG. 31 is an enlarged front view of the twelfth embodiment characterized by the shape of the fitting portion of the lens retaining frame and the shape of the guiding member of the fixed barrel. A guiding member 1201c on a fixed barrel 1201 is shaped like an elongated rail extending in the direction of the optical axis with a uniform width and having flat portions 1201c1, 1201c2 on the left and right sides. A slit 1201f is formed between the flat portions and the flat portion 1201c2 is apt to move away from the flat portion 1201c1 by a resilient force.

A second fitting arm 1203c of the second lens group retaining frame is formed with a recessed groove on top thereof, and flat portions 1203h1, 1203h2 on the left and right sides.

Then, the guiding member 1201c and the second fitting arm 1203c engage with each other by contact between the flat portion 1201c1 of the guiding member 1201c and the flat portion 1203h1 of the fitting arm and between the flat portion 1201c2 of the guiding member 1201c and the flat portion 1203h2 of the fitting arm.

In this manner, since pressurization by a resilient force is established, engagement without rattling is enabled, and hence the lens retaining frame can be supported with high degree of accuracy.

Thirteenth Embodiment

Figure 32:
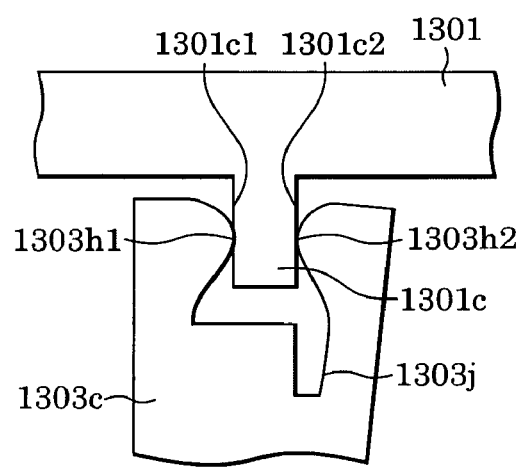
FIG. 32 is an enlarged view of the lens retaining frame fitting portion and the fixed barrel guiding member in a thirteenth embodiment.

Referring to FIG. 32, a thirteenth embodiment of the invention will be described below.

FIG. 32 is an enlarged front view of the thirteenth embodiment characterized by the shape of the fitting portion of the lens retaining frame and the shape of the guiding member of the fixed barrel. A guiding member 1301c in the fixed barrel 1301 is shaped like an elongated rail extending in the direction of optical axis with a uniform width and having flat portions 1301c1, 1301c2 on the left and right sides.

A second fitting arm 1303c of the second lens retaining frame is formed with a recessed groove on top thereof, and projections 1303h1, 1303h2 are formed on the left and right sides. A slit 1303j is formed between the projections, and the projection 1303h2 is apt to resiliently approach the projection 1303h1.

Then, the guiding member 1301c and the second fitting arm 1303c engage with each other by contact between the flat portion 1301c1 of the guiding member 1301c and the projection 1303h1 of the fitting arm and pressurization of the flat portion 1301c2 of the guiding member 1301c against the projection 1303h2 of the fitting arm.

In this manner, since pressurization is established by a resilient force, engagement without rattling is enabled, and hence the lens retaining frame can be supported with high degree of accuracy.

In other words, in the lens barrel described above, since the lens retaining frame is supported in a space, support of the lens retaining frame with higher degree of accuracy than before is enabled by providing different supporting roles to the respective three supporting devices and adjusting and correcting the respective three supporting devices.

In another lens barrel, since two directions are orthogonal to each other, the direction with less accuracy is clarified. Also, since the uniform accuracy can be maintained in any directions in 360°, support of the lens retaining frame with higher degree of accuracy than before is enabled.

In still another lens barrel, since the lens retaining frame is supported in a space, support of the lens retaining frame with higher degree of accuracy than before is enabled by providing different supporting roles to the respective two supporting devices and adjusting and correcting the two respective supporting devices.

In another lens barrel, since the two planes are orthogonal to each other, the direction with less accuracy is clarified. Also, since the uniform accuracy can be maintained in any directions in 360°, support of the lens retaining frame with higher degree of accuracy than before is enabled.

In further lens barrel, since the guiding member is supported by the inner surface of the fixed barrel, rigidity of the guiding member increases, and hence support of the lens retaining frame with high degree of accuracy is enabled.

By providing only three guiding members, downsizing of the lens barrel is enabled.

Also, by differentiating the length of the respective guiding members, the first engaging portion serves as a first supporting device in the first aspect of the invention, the second engaging portion serves as a second supporting device in the first aspect of the invention, and the third engaging portion serves as a third supporting device in the first aspect of the invention. Accordingly, by providing different supporting roles to the respective three engaging portions and adjusting and correcting the respective three engaging-portions, support of the lens retaining frame with higher degree of accuracy than before is enabled.

Also, by disposing the guiding member in contact with the inner surface of the fixed barrel, useless space is eliminated, and hence downsizing of the lens barrel is enabled.

Since no additional component for supporting the lens retaining frame is necessary, a lens barrel with low cost is enabled.

In another lens barrel, since the guiding members are positioned orthogonally to each other by 90°, or at equal angular intervals by 120°, the direction with less accuracy can be clarified, and hence the uniform accuracy in any directions in 360° can be maintained, whereby support of the lens retaining frame with higher degree of accuracy than before is enabled.

In another lens barrel, since the guiding member is supported on the inner surface of the fixed barrel, rigidity of the guiding member increases, and hence the lens supporting frame can be supported with high degree of accuracy.

Also, according to the third aspect of the invention, the first engaging portion and the third engaging portion achieves the first supporting device, the second engaging portion and the fourth engaging portion achieves the second supporting device, and adjustment and correction of the four respective engaging portions enables support of the lens retaining frame with higher degree of accuracy than before.

Also, by disposing the guiding portion in contact with the inner surface of the lens barrel, the useless space is eliminated, and hence downsizing of the lens barrel is enabled.

Also, since no additional component for supporting the lens retaining frame is necessary, a lens barrel with low cost is enabled.

In another lens barrel, since the connecting portion which transmits force to move the lens retaining frame in the direction of the optical axis is located between the first engaging portion and the second engaged portion which provides a long length of engagement, the engaging portion which receives moment of rotation generated at the connecting portion is long, and hence rattling or deformation can hardly occur, whereby support of lens retaining frame with high degree of accuracy is enabled.

In another lens barrel, by providing projections at the engaging portion, friction is reduced and the contact point is clarified, whereby support of the lens retaining frame with high degree of accuracy is enabled.

In still another lens barrel, when a long engaging portion of the first lens retaining frame engages a certain one guiding member, the length of engagement can be increased effectively with respect to the limited length of the guiding member by engaging the second lens retaining frame with the short engaging portion. Therefore, support of the lens retaining frame with high degree of accuracy and downsizing of the lens barrel in the direction of the optical axis are enabled.

In another lens barrel, since the guiding member and the engaging portion provide contact between the flat surfaces, engagement being resistant for destruction or deformation is established against the force from the outside, and hence support of the lens retaining frame with high degree of accuracy is enabled.

In still another lens barrel, since the guiding member on the fixed barrel has a recess, no bulge is present and hence the size of the lens barrel in the diametrical direction can be reduced.

In another lens barrel, by establishing a point contact between the guiding member and the connecting portion, friction is reduced and the contact position is clarified. Consequently, support of the lens retaining frame with high degree of accuracy is enabled.

In still another lens barrel, since the contact between the guiding member and the connecting portion is a point contact between a straight line and an arcuate line, friction is reduced, the contact position is clarified, and the point contact can be maintained even when the connecting portion is inclined with respect to the guiding member. Consequently, support of the lens retaining frame with high degree of accuracy is enabled.

In another lens barrel, by eliminating rattling between the guiding member and the connecting portion by a resiliently pressing device, support of the lens retaining frame with high degree of accuracy is enabled.

Also, by generating resiliency by the shape of one of the guiding member of the connecting portion, necessity of additional components is eliminated, and hence the lens barrel with low cost is enabled.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalent of the claims are thereof intended to be embraced therein.

This application claims priority from Japanese Patent Application No. 2003-393408 filed Nov. 25, 2003, which is hereby incorporated by reference herein.

What is claimed is:

1. A lens retaining frame comprising:
   a retaining frame, wherein the retaining frame supports at least one lens unit, wherein the retaining frame is configured to move along an optical axis;
   a first portion of the retaining frame, wherein the first portion reduces rotation of the retaining frame about a first axis, wherein the first axis is about orthogonal to the optical axis, and wherein the first portion reduces translation along a second axis, wherein the second axis is also about orthogonal to the optical axis and is different from the first axis;
   a second portion of the retaining frame, wherein the second portion reduces rotation of the retaining frame about the second axis; and
   a third portion of the retaining frame, wherein the third portion reduces rotation of the retaining frame about the optical axis.

2. A lens retaining frame according to claim 1, wherein the first axis and the second axis intersect at an angle of about 90 degrees.

3. A lens barrel, comprising:
   a fixed barrel including a first, second and third guiding member, wherein the first, second, and third guiding members are operatively connected to the fixed barrel, and wherein the first, second, and third guiding members extend in a direction about parallel to an optical axis of a lens unit;
   a first engaging portion of a retaining frame disposed on the outer periphery of the retaining frame and configured to engage the first guiding member by a first length, wherein the retaining frame supports the lens unit;
   a second engaging portion of the retaining frame configured to engage the second guiding member by a second length which is shorter than the first length, and wherein the second guiding member is adjacent to the first guiding member; and
   a third engaging portion of the retaining frame configured to engage a third guiding member by a third length which is shorter than the second length, and wherein the third guiding member is adjacent to the second guiding member.

4. A lens barrel according to claim 3, wherein the first, second, and third guiding members are disposed about the optical axis at angular intervals between the inclusive range of about 90 degrees to about 120 degrees.

5. A lens barrel according to claim 3, wherein a drive unit for driving the retaining frame in the direction of the optical axis and a connecting portion provided on the retaining frame for connecting the retaining frame to the drive unit, wherein the connecting portion is disposed between the first engaging portion and the second engaging portion.

6. A lens barrel according to claim 3, wherein at least one of the first engaging portion and the second engaging portion comprises projections at both ends of the retaining frame, wherein the projections extend in a direction about parallel to the optical axis, the projections being capable of coming into contact with at least one of the first, second, and third guiding members.

7. A lens barrel according to claim 3, wherein at least one of the engaging portions has a resilient engaging portion formed thereon that engages resiliently between one of the guiding members on the fixed barrel and at least one of the engaging portions of the retaining frame.

8. A lens barrel according to claim 7, wherein the resilient engaging portion interacts with a groove formed in at least one of the first, second, and third guiding members on the barrel or in at least one of the first, second, and third engaging portions of the retaining frame.

9. A lens barrel comprising:
   at least one retaining frame configured to retain a lens unit;
   a barrel configured to cover the at least one retaining frame;
   a first, second, third, and fourth guiding member which are operatively connected to the inner surface of the barrel, wherein, the first, second, third and fourth guiding members extend in a direction about parallel with the optical axis of the lens unit;
   a first engaging portion of the at least one retaining frame provided on the outer periphery of the at least one retaining frame that engages the first guiding member by a first length;
   a second engaging portion of the at least one retaining frame that engages the second guiding member by a second length which is shorter than the first length, wherein the second guiding member is adjacent to the first guiding member;
   a third engaging portion of the at least one retaining frame that engages the third guiding member by a third length which is shorter than the second length, wherein the third guiding member is adjacent to the second guiding member; and
   a fourth engaging portion of the at least one retaining frame that engages the fourth guiding member by a fourth length which is shorter than the second length, wherein the fourth guiding member is adjacent both to the third guiding member and the first guiding member.

10. A lens barrel comprising:
    at least two retaining frames, a first retaining frame and a second retaining frame, wherein the first retaining frame is configured to retain a first lens unit, and the second retaining frame is configured to retain a second lens unit, wherein there is an optical axis associated with the first lens unit;
    a barrel for covering the first and second retaining frames;
    at least two guiding members extending in parallel with the optical axis and being disposed on the inner surface of the barrel; and
    at least two engaging portions on the first and second retaining frames, a first engaging portion and a second engaging portion, wherein the at least two engaging portions are configured to engage the at least two guiding members, wherein the first engaging portion on the first retaining frame has the longest length of engagement with the first guiding member and the first engaging portion on the second retaining frame has the shortest length of engagement with the first guiding member, and a second engaging portion on the first retaining frame has the shortest length of engagement with the second guiding member and the second engaging portion on the second retaining frame has the longest length of engagement with the second guiding member.

11. A lens barrel according to claim 10, wherein the cross-section of at least one of the at least two guiding members on the barrel has a projected rectangular shape, and the cross-section of at least one of the at least two engaging portions on the retaining frame has a recessed rectangular shape, and wherein two opposing linear parallel portions of at least one of the at least two engaging portions engage two opposing linear parallel portions of at least one of the at least two guiding members.

12. A lens barrel according to claim 10, wherein the cross-section of at least one of the at least two guiding members on the barrel has a recessed rectangular shape and the cross-section of at least one of the at least two engaging portions on the retaining frame has a projected rectangular shape, and wherein two opposing linear parallel portions of at least one of the at least two engaging portions engage two opposing linear parallel portions of at least one of the at least two guiding members.

13. A lens barrel according to claim 10, wherein the cross-section of at least one of the at least two guiding members on the barrel and the cross-section of at least one of the at least two engaging portions of at least one of the at least two retaining frames are formed into shapes so as to be capable of point contact.

14. A lens barrel according to claim 13, wherein the cross-section of the guiding member on the barrel has arcuate portions on both sides of a projected rectangular shape, and the cross-section of the engaging portion of the retaining frame has a recessed rectangular shape, and wherein two opposing parallel linear portions of the engaging portion of the retaining frame engage the arcuate portions of the guiding member.

15. A lens barrel according to claim 13, wherein the cross-section of the guiding member on the barrel has arcuate portions on both sides of a recessed rectangular shape, and the cross-section of the engaging portion of the retaining frame has a projected rectangular shape, and wherein two opposing parallel linear portions of the engaging portion of the retaining frame engage the arcuate portions on the guiding member.

16. A lens barrel according to claim 13, wherein the cross-section of the engaging portion of the retaining frame has arcuate portions on both sides of a recessed rectangular shape, and the cross-section of the guiding member on the barrel has a projected rectangular shape, and wherein two opposing parallel linear portions of the guiding member on the barrel engage the arcuate portions of the engaging portion.

17. A lens barrel according to claim 13, wherein the cross-section of the engaging portion of the retaining frame has arcuate portions on both sides of a projected rectangular shape, and the cross-section of the guiding member on the barrel has a recessed rectangular shape, and wherein two opposing parallel linear portions of the guiding member on the barrel engage the arcuate portions of the engaging portion.

18. An image forming apparatus comprising:
   a lens barrel according to any one of claims 9, and 10 or a lens retaining frame according to claim 1; and
   an image pickup device, wherein the image pickup device is configured to record an image from light passing through the lens barrel or the lens retaining frame.

* * * * *